(12) United States Patent
Oh et al.

(10) Patent No.: US 11,717,782 B2
(45) Date of Patent: Aug. 8, 2023

(54) MIXED FLOW FAN MODULE AND PORTABLE AIR PURIFIER WITH MIXED FLOW FAN MODULE

(71) Applicant: LG ELECTRONICS INC., Seoul (KR)

(72) Inventors: Si Young Oh, Seoul (KR); Juhyun Kim, Seoul (KR); Kidong Kim, Seoul (KR); Seok-Ho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 17/384,893

(22) Filed: Jul. 26, 2021

(65) Prior Publication Data

US 2022/0023788 A1    Jan. 27, 2022

(30) Foreign Application Priority Data

Jul. 27, 2020 (KR) .......................... 10-2020-0093403
Dec. 14, 2020 (KR) .......................... 10-2020-0174530

(51) Int. Cl.
| | |
|---|---|
| *B01D 46/00* | (2022.01) |
| *F04D 19/00* | (2006.01) |
| *F04D 29/52* | (2006.01) |
| *F04D 17/06* | (2006.01) |
| *F04D 29/46* | (2006.01) |

(52) U.S. Cl.
CPC ..... *B01D 46/0047* (2013.01); *B01D 46/0002* (2013.01); *F04D 17/06* (2013.01); *F04D 19/002* (2013.01); *F04D 29/462* (2013.01); *F04D 29/522* (2013.01)

(58) Field of Classification Search
CPC . B01D 46/0047; B01D 46/0002; F04D 17/06; F04D 19/002; F04D 29/462; F04D 29/522
See application file for complete search history.

(56) References Cited

U.S. PATENT DOCUMENTS

| | | | |
|---|---|---|---|
| 11,524,254 B2 * | 12/2022 | Yang | B01D 46/0005 |
| 11,525,588 B2 * | 12/2022 | Kim | B60H 3/06 |
| 11,525,589 B2 * | 12/2022 | Son | B01D 46/0049 |
| 2017/0122329 A1 * | 5/2017 | Son | F04D 25/08 |
| 2019/0264948 A1 | 8/2019 | Jung et al. | |

(Continued)

FOREIGN PATENT DOCUMENTS

| | | |
|---|---|---|
| EP | 2338581 | 6/2011 |
| EP | 3163178 | 5/2017 |

(Continued)

OTHER PUBLICATIONS

European Search Report dated Dec. 13, 2021 issued in Application No. 21187650.3.

(Continued)

*Primary Examiner* — Aaron R Eastman
(74) *Attorney, Agent, or Firm* — Ked & Associates

(57) ABSTRACT

A mixed flow fan module and a portable air purifier including a mixed flow fan module are provided. The mixed flow fan module may include a fan housing having an outer surface that is curved along a circumferential direction and defining an operation space, a fan rotatably disposed inside of the fan housing, and a fan base coupled to the fan housing and configured to guide air toward the fan.

20 Claims, 14 Drawing Sheets

(56) References Cited

U.S. PATENT DOCUMENTS

2022/0128281 A1* 4/2022 Tsuji .................... F24F 11/30
2022/0186950 A1* 6/2022 Park .................... F24F 8/80

FOREIGN PATENT DOCUMENTS

| KR | 10-2010-0029617 | 3/2010 |
| KR | 10-2014-0138508 | 12/2014 |
| KR | 10-2019-0038978 | 4/2019 |
| KR | 10-2019-0117066 | 10/2019 |
| KR | 10-2020-0037187 | 4/2020 |

OTHER PUBLICATIONS

Korean Office Action dated Aug. 28, 2022 issued in Application No. 10-2020-0174530.

* cited by examiner

MIXED FLOW FAN MODULE AND PORTABLE AIR PURIFIER WITH MIXED FLOW FAN MODULE

CROSS-REFERENCE TO RELATED APPLICATION(S)

This application claims priority to and the benefit of Korean Patent Application No. 10-2020-0093403 filed in Korea on Jul. 27, 2020, Korean Patent Application No. 10-2020-0174530 filed on Dec. 14, 2020, the disclosures of which are incorporated herein by reference in their entirety.

BACKGROUND

1. Field

A mixed flow fan module and a portable air purifier including a mixed flow fan module are disclosed herein.

2. Background

An air purifier may be widely used in modern life and purify air by filtering physical particles, such as dust, fine dust, and ultrafine dust, chemical substances, such as odor particles and harmful gases, and microorganisms, such as bacteria and viruses. Air purifiers are becoming essential apparatuses even in general homes due to an influence of urbanization, industrialization, and internationalization. In addition, demand for the air purifier is rapidly increasing due to an increase in fine dust and allergic patients, and an improvement in the standard of living.

The air purifier may have a large size such that the air purifier is used for an environment with an area exceeding 100 m$^2$, such as a general home. A filter to filter the physical particles, such as dust, a filter to filter chemical substances, such as gas, and a filter to filter microorganisms, such as bacterial viruses may be used for the air purifier in combination. That is, the air purifier having the large size may be used in a large space such that the air purifier accommodates various types of filters in combination.

However, using the large-sized air purifier in a small space, such as a single room and an interior of a vehicle may be inefficient in terms of space utilization, mobility, and energy consumption. In addition, a small-sized air purifier may be more suitable for frequently moving users instead of the large-sized air purifier, and an air purifier that may be portably used by individuals may also be more suitable for frequently moving users. Portable air purifiers that may be portably used by individuals are being developed.

The portable air purifier has a small size and a light weight, such that a user easily carries the portable air purifier. The user may easily use the portable air purifier in a desired place and easily carrying the portable air purifier. That is, the portable air purifier may be suitable for users having a life pattern of frequently going out and moving several places rather than staying in one place, such as at home for a long period of time.

In a related art document, Korean Patent Publication No. 2020-0037187, published on Apr. 8, 2020 and entitled "Portable Air Purifier", and which is hereby incorporated by reference, an air purifier suctions air from a rear surface thereof and discharges the air to a front thereof. However, the portable air purifier in the related art directs air horizontally and fails to properly deliver purified air to the user.

In addition, when a housing defining a vertical air flow path is used to deliver purified air to a user, an additional fan module defining a flow path of air moving from a lower side to an upper side along the housing is not provided. In this case, air cleaning efficiency is decreased. Therefore, there is a need to improve efficiency.

BRIEF DESCRIPTION OF THE DRAWINGS

Embodiments will be described in detail with reference to the following drawings in which like reference numerals refer to like elements, and wherein.

DETAILED DESCRIPTION

Figure 1:
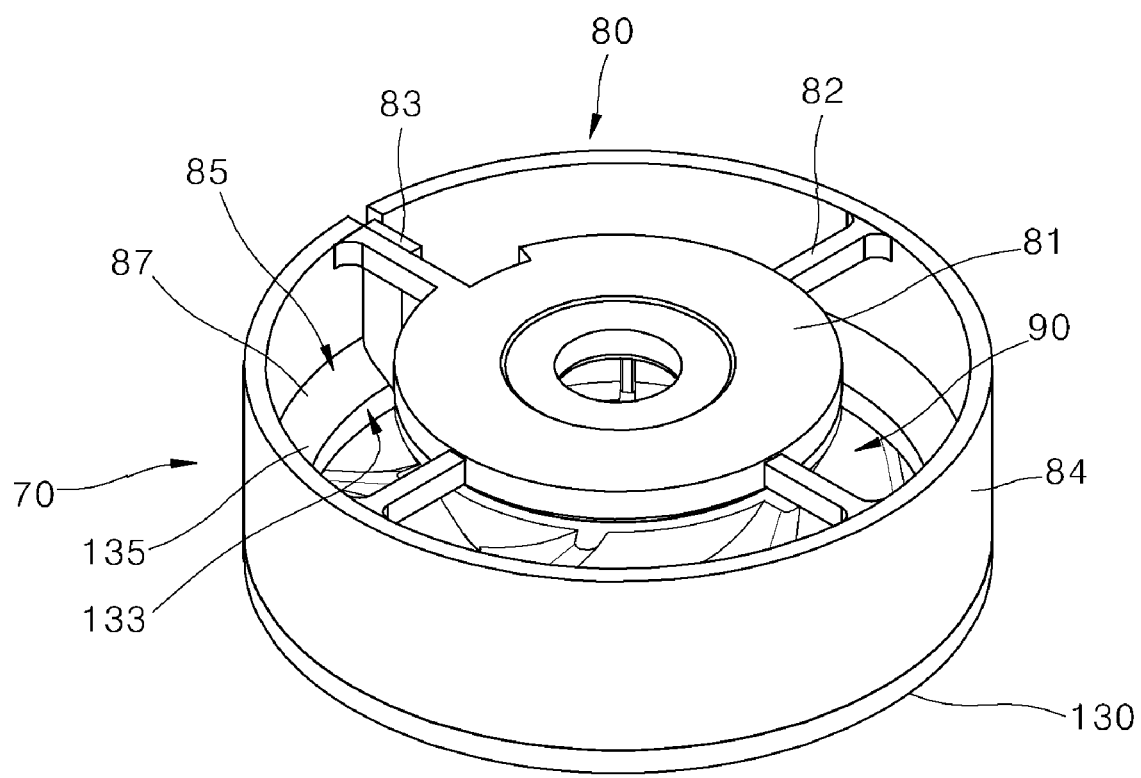
FIG. 1 is a perspective view of a mixed flow fan module according to an embodiment.

Embodiments are described with reference to accompanying drawings. Therefore, a person having ordinary knowledge in the art to which the embodiments pertain will be able to easily embody the technical idea. Description of well-known technology relating to the embodiments may be omitted if it unnecessarily obscures the gist. Hereinafter, one or more embodiments are described with reference to the accompanying drawings. The same or like reference numerals may be used to refer to the same or similar components.

Terms such as first, second, and the like may be used herein to describe various elements; however, these elements are not limited by these terms. These terms are intended to distinguish one element from another element. A first element may be a second element unless otherwise stated.

In this document, the terms "upper," "lower," "on," "under," or the like are used such that, where a first component is arranged at "an upper portion" or "a lower portion"

of a second component, the first component may be arranged in contact with the upper surface or the lower surface of the second component, or another component may be disposed between the first component and the second component. Similarly, where a first component is arranged on or under a second component, the first component may be arranged directly on or under (in contact with) the second component, or one or more other components may be disposed between the first component and the second component.

Further, the terms "connected," "coupled," or the like are used such that, where a first component is connected or coupled to a second component, the first component may be directly connected or able to be connected to the second component, one or more additional components may be disposed between the first and second components, or the first component may be connected or coupled to the second component by additional components.

Unless otherwise stated, each component may be singular or plural throughout the disclosure.

In some examples, singular expressions used in the present disclosure include plural expressions unless the context clearly indicates otherwise. In the present disclosure, terms such as "including" or "comprising" should not be construed as necessarily including all of the various components, or various steps described in the present disclosure, and terms such as "including" or "comprising" should be construed as not including some elements or some steps or further including additional elements or steps.

In the present disclosure, unless otherwise stated, "A and/or B" means A, B, or both. Unless otherwise stated, "C to D" means "C or more and D or less".

Figure 2:
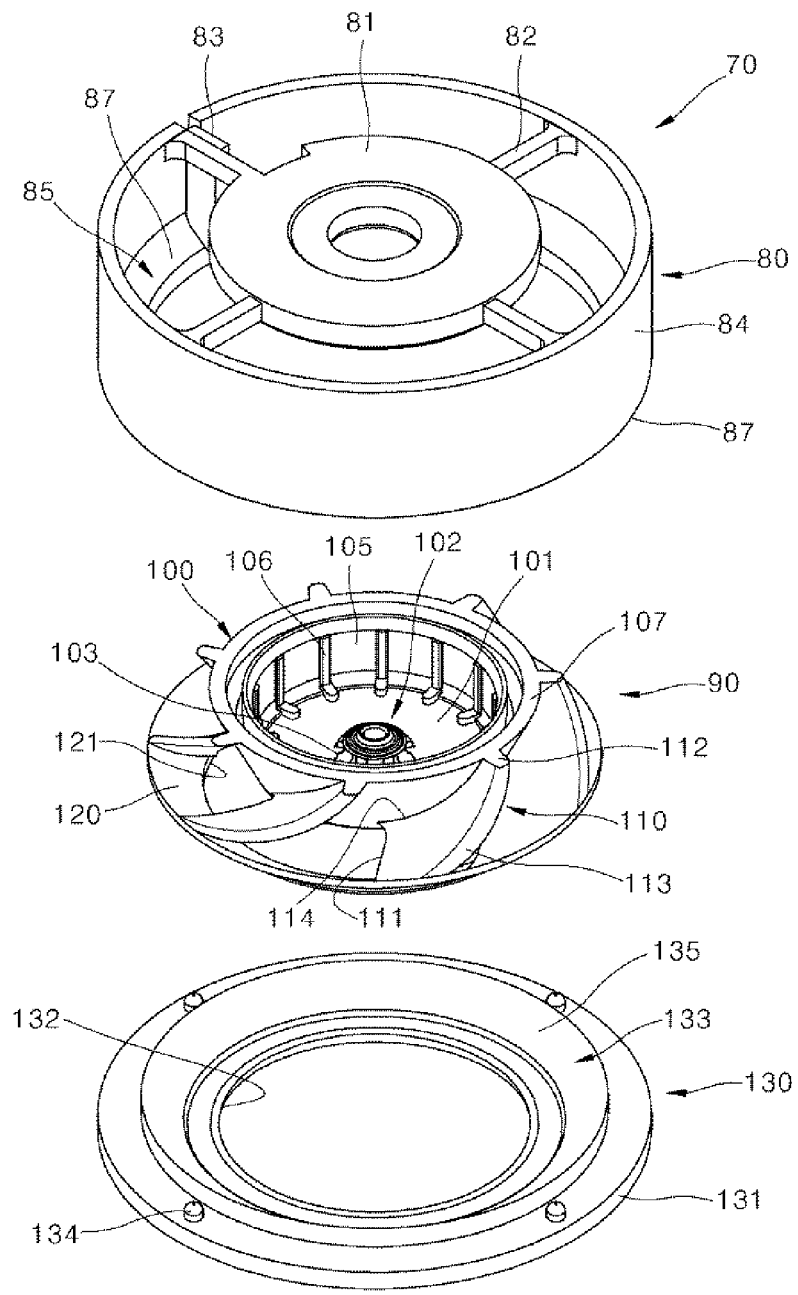
FIG. 2 is an exploded perspective view of the mixed flow fan module of FIG. 1.
Figure 3:
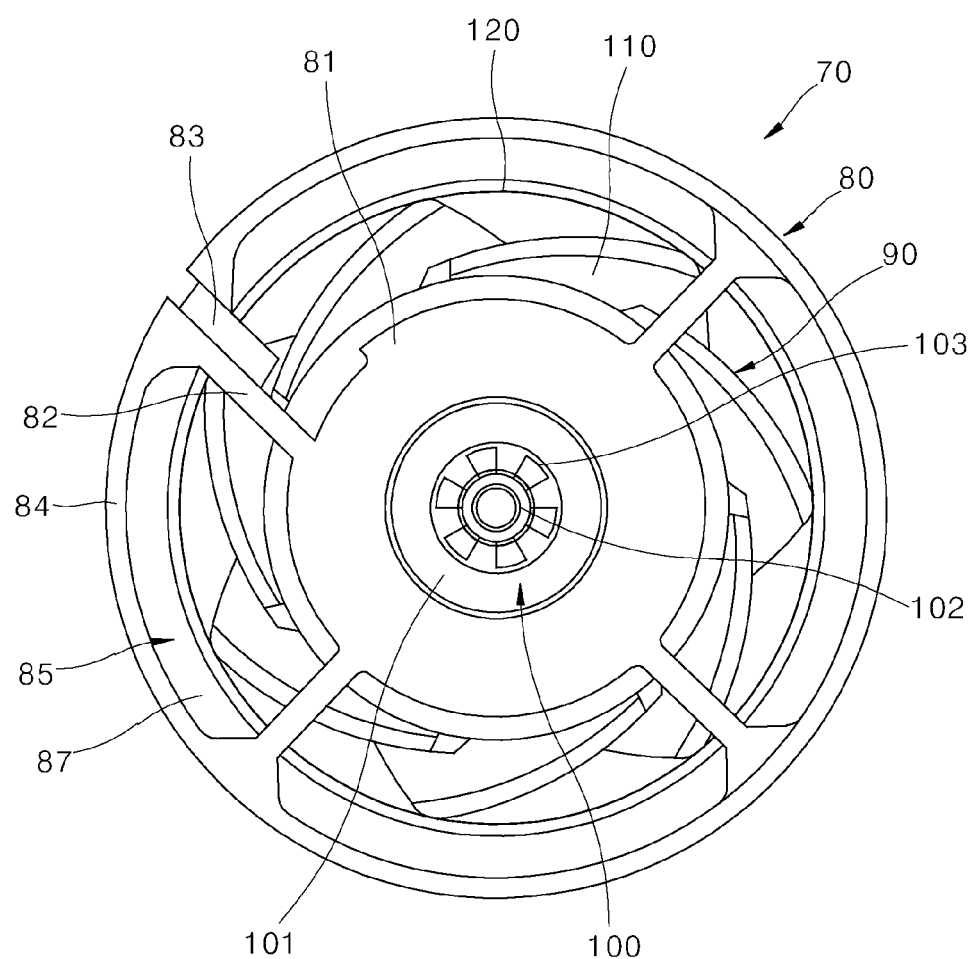
FIG. 3 is a plan view of the mixed flow fan module of FIG. 1.
Figure 4:
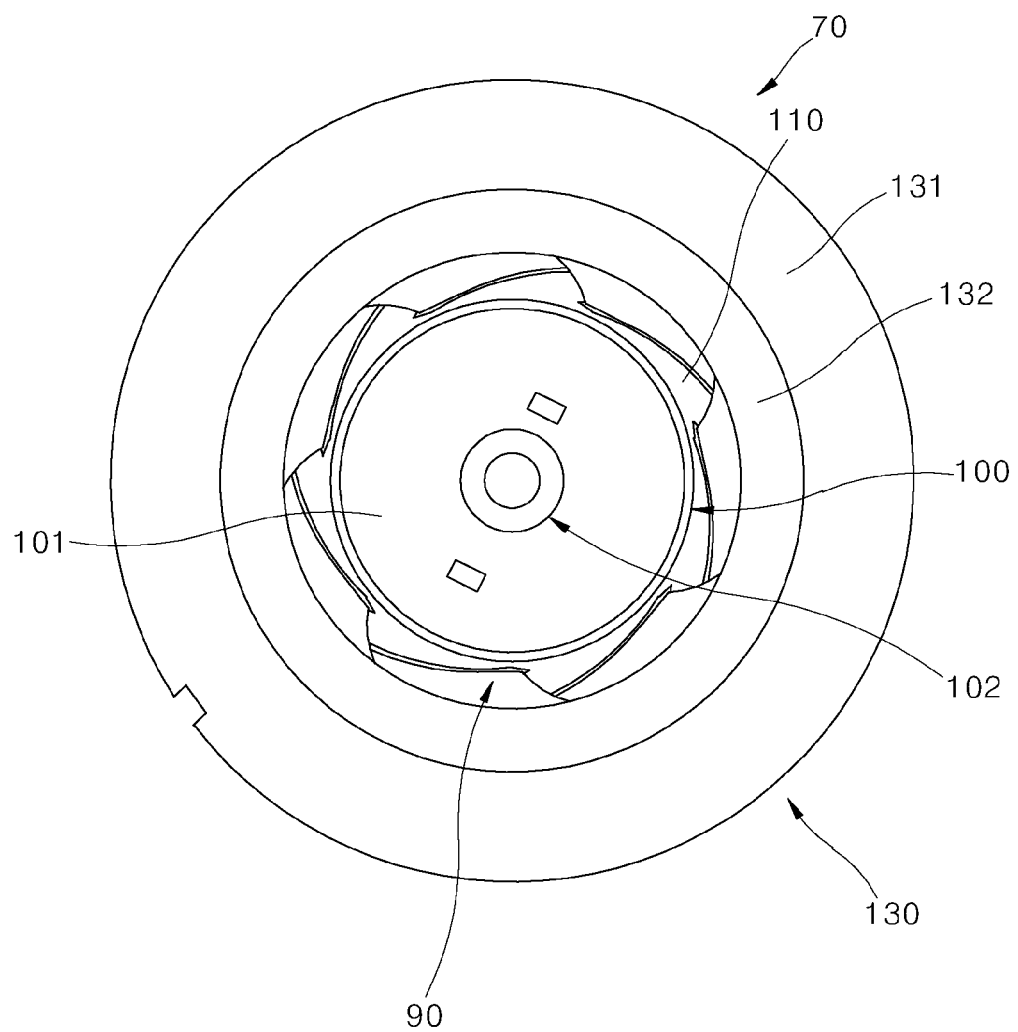
FIG. 4 is a bottom view of the mixed flow fan module of FIG. 1.
Figure 5:
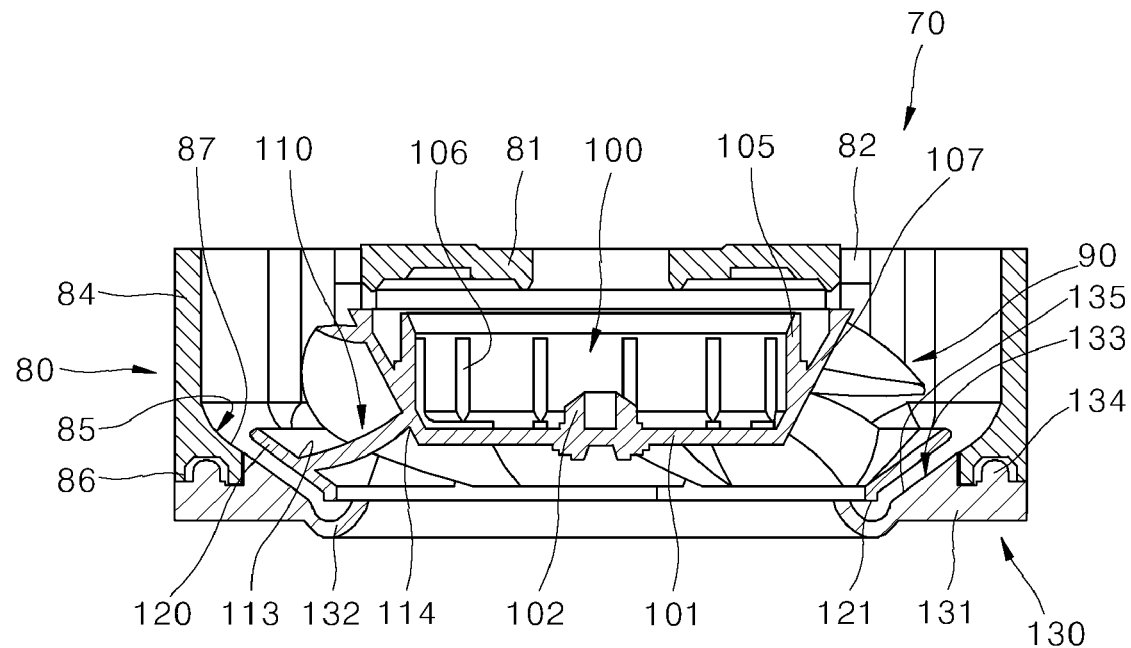
FIG. 5 is a cross-sectional view of the mixed flow fan module of FIG. 1.
Figure 6:
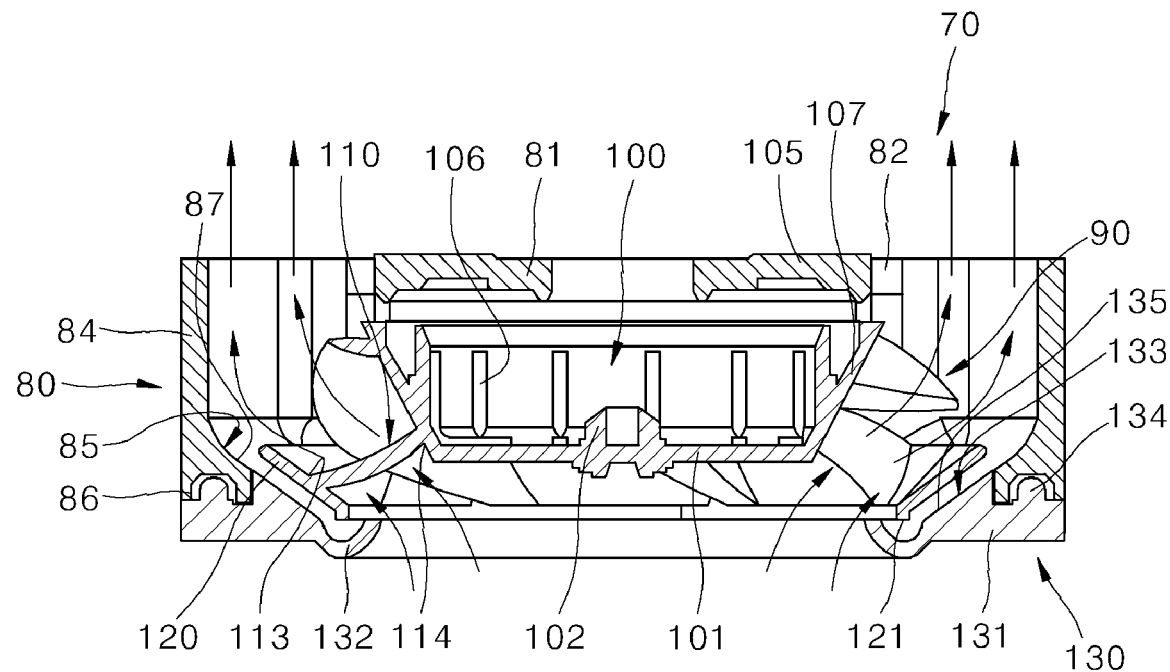
FIG. 6 is a cross-sectional view showing air passing through the mixed flow fan module of FIG. 1.

FIG. 1 is a perspective view of a mixed flow fan module according to an embodiment. FIG. 2 is an exploded perspective view of the mixed flow fan module of FIG. 1. FIG. 3 is a plan view of the mixed flow fan module of FIG. 1. FIG. 4 is a bottom view of the mixed flow fan module of FIG. 1. FIG. 5 is a cross-sectional view of the mixed flow fan module of FIG. 1. FIG. 6 is a cross-sectional view showing air passing through the mixed flow fan module of FIG. 1.

As shown in FIGS. 1 to 6, mixed flow fan module 70 according to an embodiment may have a circular outer circumference. A fan housing 80 defines an outer side of the mixed flow fan module 70 and may have an outer circumference that is curved along a circumferential direction. In addition, the mixed flow fan module 70 having the curved surface that is curved along the circumferential direction may be accommodated in a cylindrical housing 10 (see FIG. 16) in contact with an inside of the cylindrical housing 10. Therefore, a decrease in blowing capacity may be prevented and air may be easily blown from a lower side thereof to an upper side thereof along the housing 10.

In addition, various modifications may be made to the configuration in which the mixed flow fan module 70 is disposed between an inlet 21 (see FIG. 16) defined at a lower portion of the housing 10 and a discharge outlet 24 (see FIG. 16) defined at an upper portion of the housing 10 and rotates a fan to blow air in a direction toward the discharge outlet 24.

A circular shape of the outer circumferential surface of the mixed flow fan module 70 may be the same as or correspond to a circular inner shape of the housing 10. Therefore, when the mixed flow fan module 70 is fixed or fastened therein, a size of the housing 10 is not increased, thereby miniaturizing the product. In addition, when portable air purifier 1 including the mixed flow fan module according to an embodiment is used for a vehicle, the portable air purifier 1 including the mixed flow fan module may have a size such that the portable air purifier 1 including the mixed flow fan module may be accommodated in a cup holder, for example.

A fan type of the mixed flow fan module 70 may be a mixed flow fan type, and as an internal structure of the mixed flow fan module 70 is changed to mount the mixed flow fan, an upward discharge type, small-sized air purifier may be provided to maximize airflow performance.

According to an embodiment, the mixed flow fan module 70 may include fan housing 80 having an outer surface that is curved along a circumferential direction and defining an operation space, a fan 90 rotatably disposed inside of the fan housing 80, and a fan base 130 coupled to the fan housing 80 and to guide air introduction in a direction toward the fan 90. In addition, a module may be formed by coupling the fan housing 80, the fan 90, and the fan base 130, thereby facilitating assembly and disassembly and reducing production and maintenance costs.

The fan 90 according to embodiments may be rotated by operation of a motor. A rotary shaft of the motor may be connected to the fan 90 to rotate the fan 90. The fan 90 may include a rotor, and the fan housing 80, in which rotation is restricted, may include a stator. As a magnetic field of the stator is changed, the shaft rotating together with rotation of the rotor may be connected to the fan 90 to rotate the rotor and the fan 90 about the stator. As the configuration of the motor to rotate the fan 90 is a known configuration, description thereof has been omitted.

Figure 7:
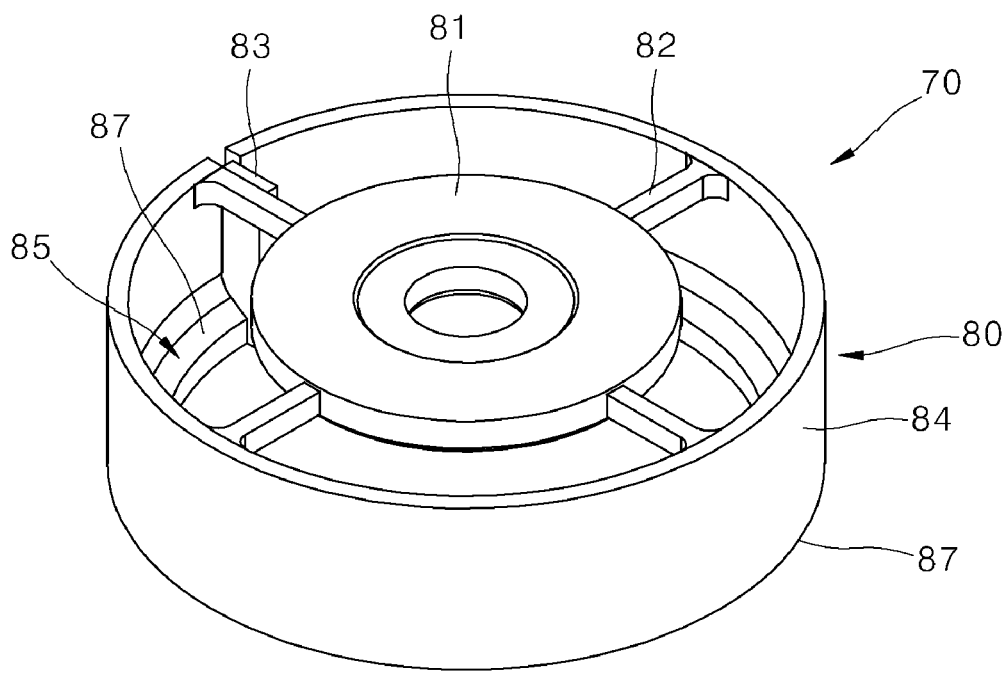
FIG. 7 is a perspective view of a fan housing according to an embodiment.
Figure 8:
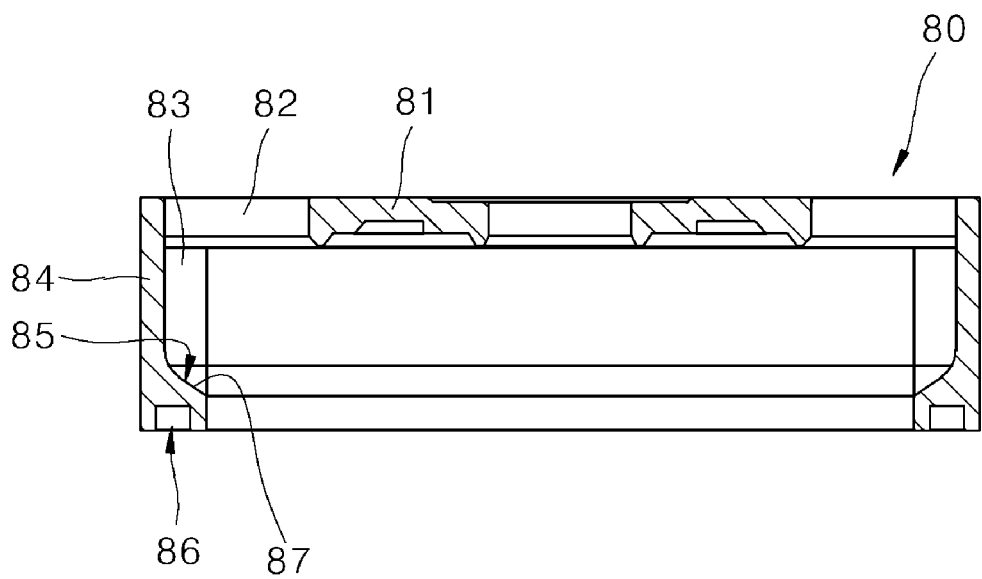
FIG. 8 is a cross-sectional view of the fan housing of FIG. 7.

FIG. 7 is a perspective view of a fan housing according to an embodiment. FIG. 8 is a cross-sectional view of the fan housing of FIG. 7.

As shown in FIGS. 7 and 8, various modifications may be made to the configuration in which the fan housing 80 is coupled to an inside of housing 10 and includes a space to rotate fan 90. According to an embodiment, the fan housing 80 may include at least one of a support plate 81, a connecting supporter 82, a wire guide 83, a side supporter 84, an inner guide 85, or a protrusion mounting groove 86.

The support plate 81 may be disposed at a central portion of the fan housing 80 and may have a disk shape. In addition, the support plate 81 may include a hole at a center thereof. A motor may be disposed at the center of the support plate 81, or a shaft connected to a motor may be disposed in a first direction.

The connecting supporter 82 may extend radially outward from the support plate 81 and be connected to the side supporter 84. A plurality of connecting supporters 82 according to an embodiment may be provided and each may have a bar shape. The connecting supporter 82 that extends radially outward from the support plate 81 may be connected to the side supporter 84.

The connecting supporter 82 according to an embodiment may be disposed below a core supporter 350 of a rotation supporter 300 (see FIG. 17) described hereinafter. Four connecting supporters 82 may be spaced apart from one another by 90 degrees and may be arranged with respect to the support plate 81. The core supporter 350 may be disposed on the connecting supporter 82.

The wire guide 83 may be disposed on a side surface of the connecting supporter 82 and support a lower portion of a wire to move the wire of an electronic device along the side surface of the connecting supporter 82. The wire guide 83 may define a protrusion at a lower portion of the side surface of the connecting supporter 82 and guide the wire of the motor disposed on the support plate 81 to extend to an outside of the fan housing 80. The wire guide 83 may be disposed on the side surface of the connecting supporter 82 and may define a concave groove to receive the wire. The wire disposed on the wire guide 83 may be received in the concave groove defined on the side surface of the connecting supporter 82 and the lower portion of the wire may be supported by the wire guide 83, thereby preventing damage to the wire.

The side supporter 84 may have a cylindrical pipe shape and define openings at an upper side and a rear side thereof. An outside of the side supporter 84 may contact an inside of the housing 10 and an inside of the side supporter 84 may be connected to the connecting supporter 82. In addition, the side supporter 84 may be spaced apart from the support plate 81, may be connected to the connecting supporter 82, and may have a circular curved surface defined along the outer circumference thereof.

The inner guide 85 may define a first inclined surface 87 which may be inclined downward from a lower side of the side supporter 84 toward a radial inner side thereof. The inner guide 85 may be disposed inside of the side supporter 84 and may prevent an air backflow phenomenon in which air blown upward by the fan 90 flows to an inlet of the fan 90 through an outer surface of the fan 90. In addition, the inner guide 85 may protrude to an inside of the side supporter 84 and have the first inclined surface 87. An inner diameter of the first inclined surface 87 may be narrowed toward the fan base 130. In addition, the inner guide 85 may be disposed at a lower portion of the side supporter 84 facing the fan base 130.

The protrusion mounting groove 86 may be concave from a lower surface of the side supporter 84 and receive a coupling protrusion 134 of the fan base 130. Various modifications may be made in which the protrusion mounting groove 86 receives the coupling protrusion 134 of the fan base 130 described hereinafter. A plurality of protrusion mounting grooves 86 according to an embodiment may be defined along a circumferential direction of the side supporter 84.

Figure 9:
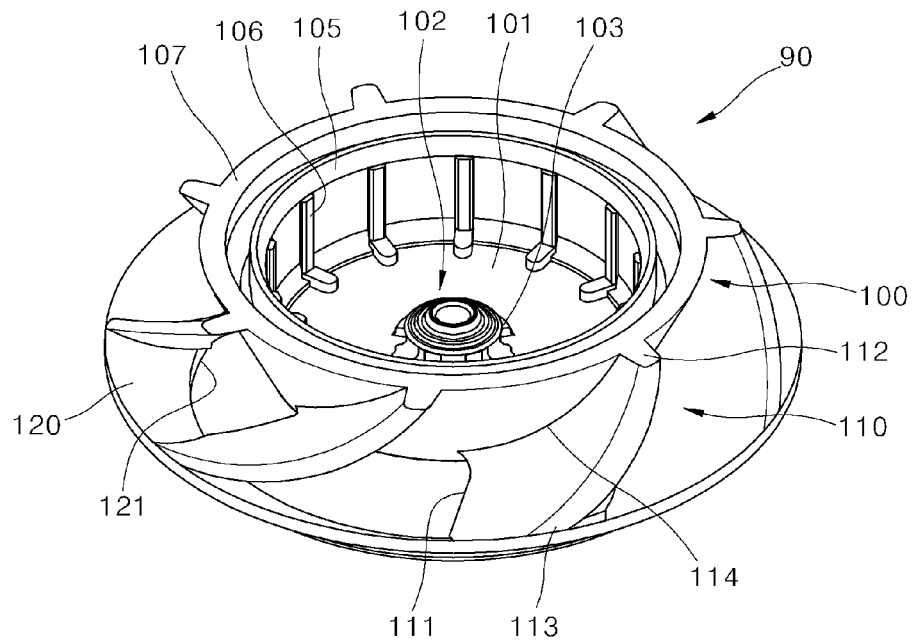
FIG. 9 is a perspective view of a fan according to an embodiment.
Figure 10:
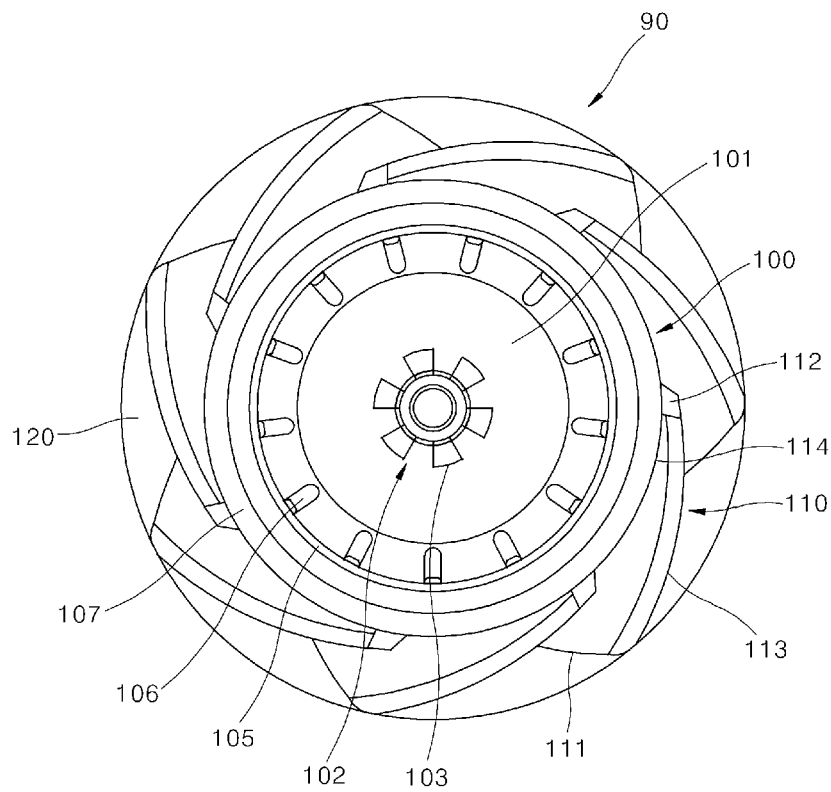
FIG. 10 is a plan view of the fan of FIG. 9.
Figure 11:
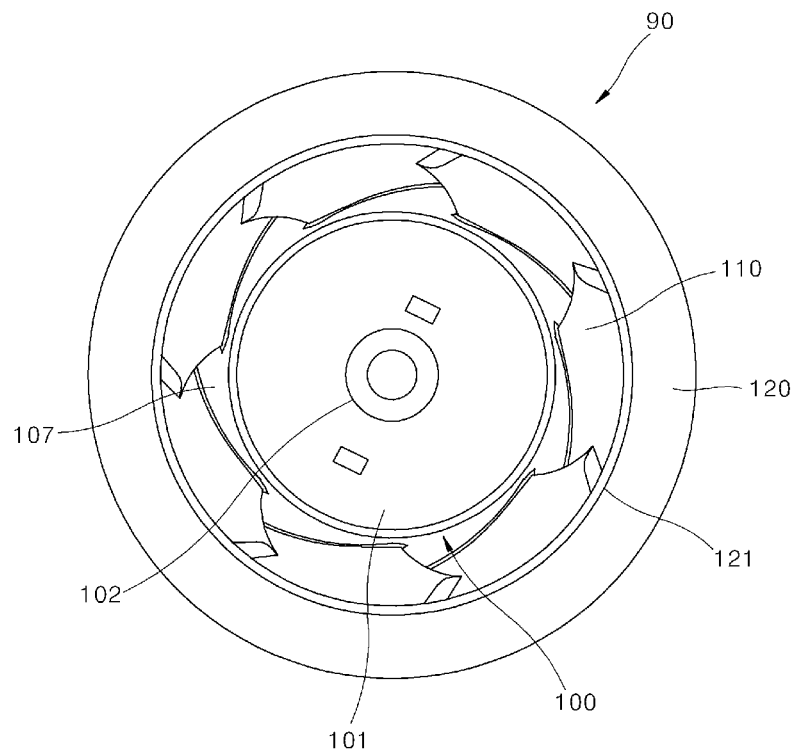
FIG. 11 is a bottom view of the fan of FIG. 9.
Figure 12:
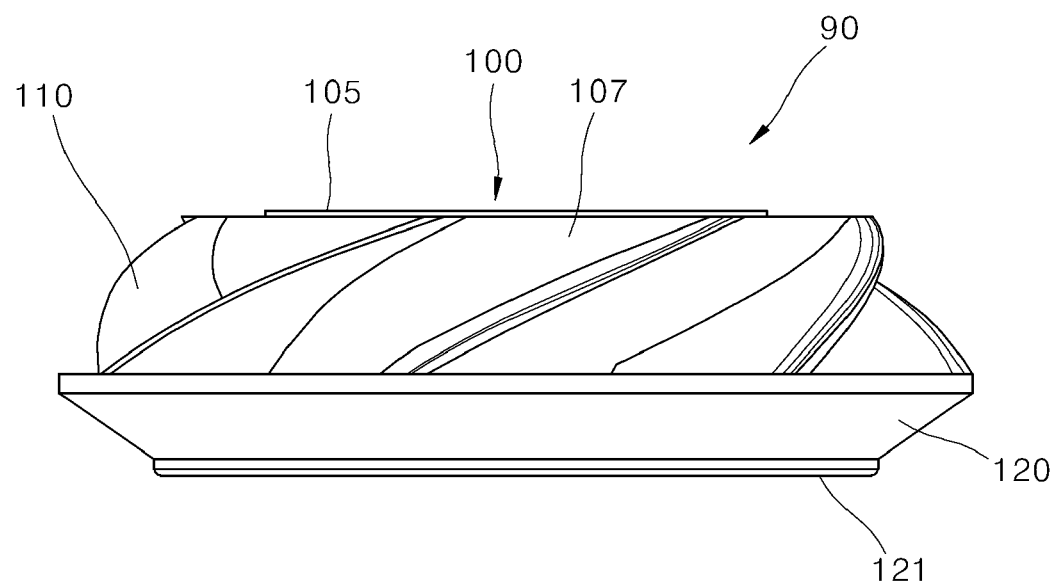
FIG. 12 is a front view of the fan of FIG. 9.
Figure 13:
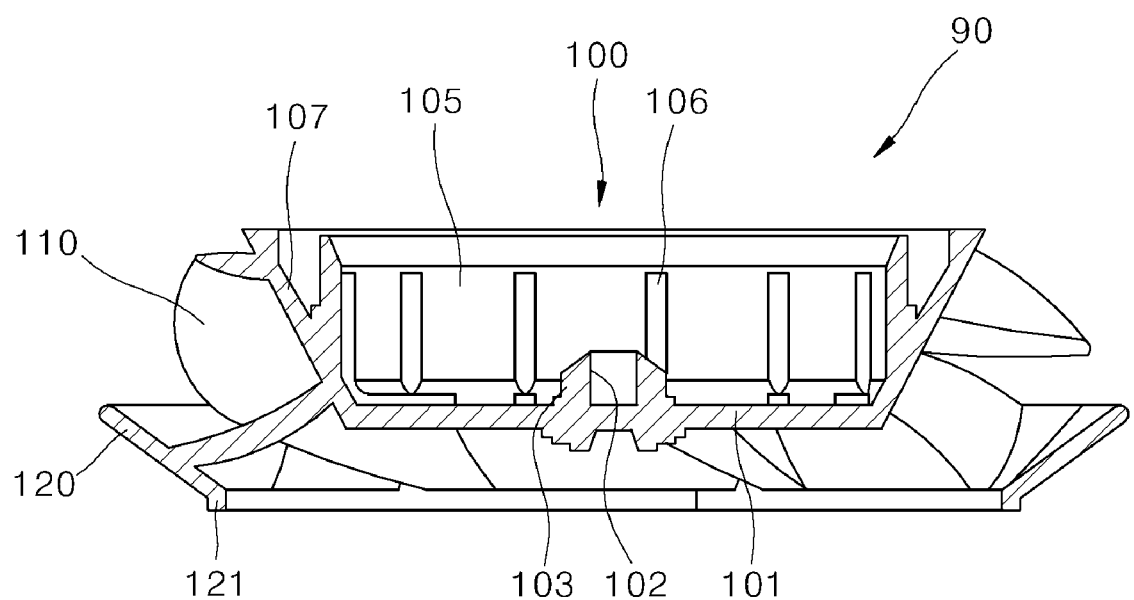
FIG. 13 is a cross-sectional view of the fan of FIG. 9.

FIG. 9 is a perspective view of a fan according to an embodiment. FIG. 10 is a plan view of the fan of FIG. 9. FIG. 11 is a bottom view of the fan of FIG. 9 FIG. 12 is a front view of the fan of FIG. 9. FIG. 13 is a cross-sectional view of the fan of FIG. 9.

Figure 16:
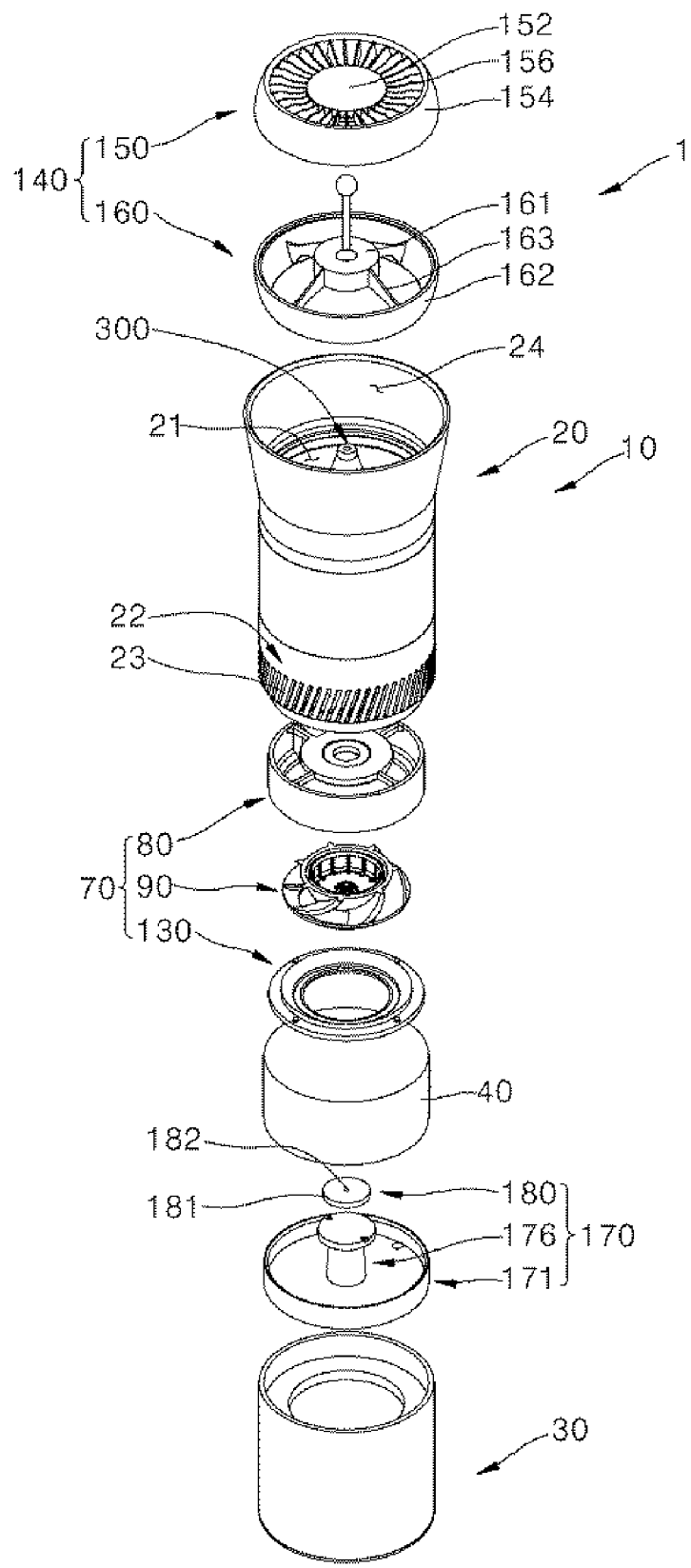
FIG. 16 is an exploded perspective view of a portable air purifier including a mixed flow fan module according to an embodiment.

As shown in FIGS. 9 to 13, various modifications may be made to the configuration in which fan 90 is rotatably disposed inside of fan housing 80 and may blow air in a direction toward a discharger 140 (see FIG. 16). A mixed flow fan may be used as the fan 90; however, embodiments are not limited thereto, and other types of fans may also be used as the fan 90 according to embodiments. The fan 90 according to an embodiment may include at least one of a hub 100, a fan blade(s) 110, or a shroud 120. Various modifications may be made to the configuration in which the hub 100 is disposed at a central portion of the fan housing 80 and rotates by receiving an external power.

The hub 100 may be disposed at a radial center of the fan 90 and may rotate together with rotation of a rotor of a motor and a rotation of a shaft which is an output shaft of the motor. According to an embodiment, the hub 100 may include at least one of a hub plate 101, a shaft coupler 102, an inner protrusion 105, a skirt 107, a first reinforcing protrusion(s) 103, or a second reinforcing protrusion(s) 106.

The hub plate 101 may be rotatably disposed inside of the fan housing 80 and located at a radial center of the fan housing 80. In addition, the hub plate 101 may have a disk shape and may be arranged in parallel to the support plate 81. The shaft coupler 102 may be disposed on the hub plate 101.

The shaft coupler 102 may be disposed at a radial center of the hub plate 101. The shaft coupler 102 may protrude from the hub plate 101 in at least one of an upward direction or a downward direction of the hub plate 101. In addition, the shaft coupler 102 may be coupled to an axial end of the shaft transmitting a rotational power and may receive the rotational power. For example, the shaft coupler 102 and the shaft may be coupled to each other by fitting the shaft to an outside of the shaft coupler 102.

First reinforcing protrusions 103 may be spaced apart from one another by a predetermined distance and may be defined along an outer circumference of the shaft coupler 102. The first reinforcing protrusions 103 may be radially disposed around the shaft coupler 102, defined at an outside of the shaft coupler 102, and have a band shape. With this structure, stress concentrated on the shaft coupler 102 may be distributed to the first reinforcing protrusions 103, thereby reinforcing structural rigidity of the shaft coupler 102.

The inner protrusion 105 may extend from the hub plate 101 in an upward direction, that is, a direction toward the support plate 81. The inner protrusion 105 according to an embodiment may be defined along an outer edge of the hub plate 101 in a circular arc direction. The inner protrusion 105 may have a pipe shape that extends in a vertical direction.

In addition, second reinforcing protrusions 106 may be spaced apart from one another by a predetermined distance along an inner circumference of the inner protrusion 105. The second reinforcing protrusions 106 may extend in the vertical direction along an inner surface of the inner protrusion 105, a lower portion of the second reinforcing protrusions 106 may be bent toward the shaft coupler 102, connected to the hub plate 101, and may have a band shape. With this structure, stress concentrated on the inner protrusion 105 may be distributed to the second reinforcing protrusion 106, thereby reinforcing structural rigidity of the inner protrusion 105. As necessary, the rotor of the motor may be coupled to the inside of the inner protrusion 105.

The skirt 107 may protrude upward from the inner protrusion 105 or the hub plate 101 toward the support plate 81. The skirt 107 according to an embodiment may extend obliquely upward from an outside of the inner protrusion 105. In addition, the skirt 107 may include an inclined surface that is inclined outward in a second direction as the skirt 107 protrudes away from the hub plate 101 in a first direction. The skirt 107 may be disposed at the outside of the inner protrusion 105 and an inner diameter of the skirt 107 may be increased from a lower side thereof to an upper side thereof.

For example, a shape in which the hub plate 101 and the skirt 107 are connected may be a truncated cone shape including a hollow and defining an opening at a side thereof. The skirt 107 may have a shape of a funnel defining an opening at a top thereof and including a bottom blocked by the hub plate 101.

A plurality of fan blades 110 may be provided and may be spaced apart from one another by an equal distance along an outer circumferential surface of hub 100. The fan blades 110 may protrude to an outside of the hub 100 around the hub 100 and extend spirally. In addition, the plurality of fan blades 110 may be spaced apart from one another by a predetermined distance along a circumferential direction of the hub 100.

According to an embodiment, the fan blades 110 may protrude to an outside of skirt 107 along a centrifugal direction that extends spirally from a center of the shaft coupler 102. In addition, when a direction toward the shaft coupler 102 from outside of the shaft coupler 102 is referred to as "a radial direction", a radial inner side of the fan blade 110 may be connected to the skirt 107 and a radial outer side of the fan blade 110 may be connected to shroud 120 described hereinafter. In addition, a first end of the fan blade 110 may be connected to the hub 100, the fan blade 110 may connect the skirt 107 to the shroud 120, and may extend spirally.

The skirt 107 may be directly connected to the fan blade 110 among components of the hub 100 and directly contact air passing through the fan blade 110. The skirt 107 may be closely related to a flow path of air passing through mixed flow fan module 70.

Each fan blade 110 connecting the shroud 120 to the skirt 107 may include a first end 111, a second end 112, a first edge 113, and a second edge 114. The first end 111 may be disposed at a front side of the fan blade 110 in a rotational direction and may have a straight shape that extends in the radial direction. The rotational direction is referred to as a rotational direction of the fan 90. The second end 112 may be disposed at a rear side of the fan blade 110 in the rotational direction and may be arranged radially around the shaft coupler 102.

The first edge 113 may connect a first end of the first end 111 to a first end of the second end 112. The first edge 113 may be connected to an inner circumferential surface of the shroud 120.

The second edge 114 may connect a second end of the first end 111 to a second end of the second end 112. The second edge 114 may be connected to an outer circumferential surface of the hub 100. In addition, the second end of the first end 111 and the second end of the second end 112 may be connected to the outer circumferential surface of the skirt 107.

The first end of the first end 111 may be disposed closer to the radial center of the hub plate 101 than the first end of the second end 112. In addition, the second end of the second end 112 may be disposed closer to the radial center of the hub plate 101 than the second end of the first end 111. For this arrangement, the first end and the second end of the first end 111 are disposed forward in the rotational direction than those of the second end 112 and a radius of the skirt 107 decreases toward the front in the rotational direction.

According to this embodiment, the fan blade 110 is connected to the skirt 107 of the hub 100. The skirt 107 defines an inclined surface that is inclined upward to guide the airflow into the mixed flow fan module 70 in an upward inclined direction.

Various modifications may be made to the configuration in which shroud 120 may be connected to a second end of fan blade 110, have an annular shape, and be spaced apart from a fan base 130.

The shroud 120 may be disposed along the outer circumference of skirt 107 and connected to the skirt 107 by the fan blade 110. In addition, an outer diameter of the hub 100 and an inner diameter of the shroud 120 may each decrease to a lower side thereof from an upper side thereof.

In addition, a distance between the shroud 120 and the skirt 107 may increase from a lower side thereof toward an upper side thereof. In addition, if an angle between the shroud 120 and a horizontal line is angle B1 and an angle between the skirt 107 and the horizontal line is angle B2, angle B1 is smaller than angle B2. The distance between the shroud 120 and the skirt 107 connected by the fan blade 110 may increase from the lower side thereof to the upper side thereof, thereby facilitating a blowing operation of the mixed flow fan to discharge air in an upward inclined direction and increasing an amount of blown air.

The shroud 120 may be spaced apart from the hub 100 by a predetermined distance in the radial direction and may be disposed radially outside of the hub 100. In addition, the shroud 120 may be spaced apart from the hub 100 by a distance corresponding to a radial length of the fan blade 110. In addition, each fan blade 110 may connect the skirt 107 of the hub 100 and the shroud 120.

The shroud 120 may have an inclined surface substantially in parallel to the skirt 107. In this embodiment, the skirt 107 and the shroud 120 are in an arranged state in which the distance between the skirt 107 and the shroud 120 increases toward the upper side of the shroud 120.

According to an embodiment, the shroud 120 may further include an inlet protrusion 121 defined at a lower portion of the shroud 120. The inlet protrusion 121 defined at the lower portion of the shroud 120 may have a ring shape and extend from the lower side of the funnel-shaped shroud 120 in the first direction. In addition, the inlet protrusion 121 may extend downward and be spaced apart from the fan base 130 by a predetermined distance. The inlet protrusion 121 may be defined inside bell mouth 132 described hereinafter, thereby preventing air backflow to the inlet defined at the lower portion of the shroud 120 along the outside of the shroud 120.

Figure 14:
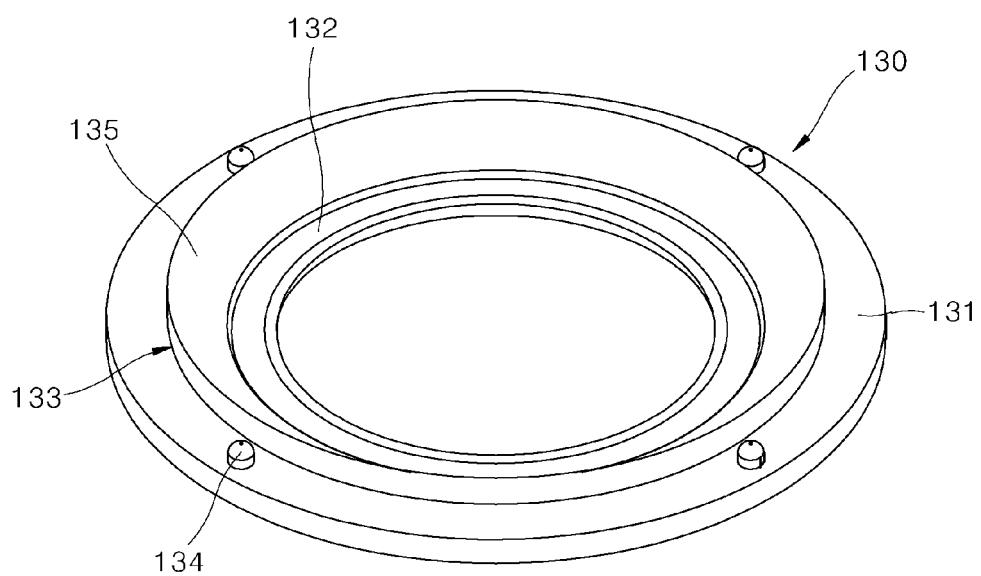
FIG. 14 is a perspective view of a fan base according to an embodiment.
Figure 15:
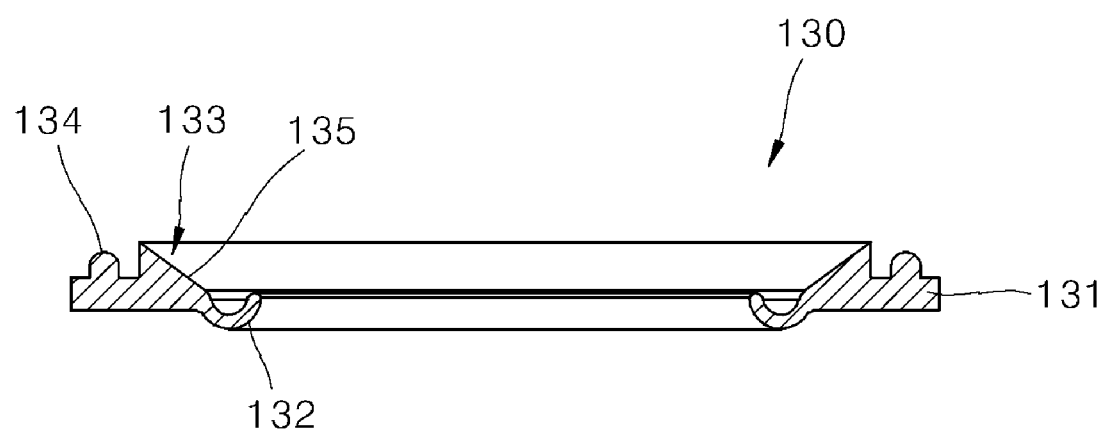
FIG. 15 is a cross-sectional view of the fan base of FIG. 14.

FIG. 14 is a perspective view of a fan base according to an embodiment. FIG. 15 is a cross-sectional view of the fan base of FIG. 14.

As shown in FIGS. 14 and 15, various modifications may be made to the configuration in which the fan base 130 is coupled to a lower surface of fan housing 80 and introduces air into fan 90 through filter 40 (see FIG. 16).

In addition, the fan base 130 may include a base plate 131 and bell mouth 132. The base plate 131 may have a plate shape, extend annularly, and include a hole at a central portion thereof to allow air to flow therethrough. The bell mouth 132 may have an annular shape, be disposed along an inner side of the base plate 131 facing the hole, define a groove concave upward, and surround a lower side of inlet protrusion 121.

The fan base 130 may be disposed between the filter 40 and the fan 90. In addition, an edge shape of the fan base 130 may correspond to that of the filter 40. For example, when the filter 40 has a cylindrical shape and the edge of the filter 40 has a circular shape, the fan base 130 may have an annular shape with a hollow.

The bell mouth 132 may have an annular shape and be disposed at an inside of the base plate 131 facing the hollow. The bell mouth 132 may have a concave longitudinal cross-section surrounding the lower surface of the inlet protrusion 121 of the shroud 120 and extend along a circumferential direction.

The bell mouth 132 may surround an outer circumferential surface of the hollow defined at the center of the base plate 131. The bell mouth 132 may be convex toward the lower side thereof and may define a groove that is concave toward the upper side thereof.

At least a portion of the bell mouth 132 may be inserted into a radial inner side of the shroud 120. The bell mouth 132 may guide a suction flow at the inlet of the mixed flow fan module 70, thereby contributing to improvement of a suction and discharge performance of the mixed flow fan module 70.

Coupling protrusion 134 may protrude upward from base plate 131. The fan base 130 may be coupled to the lower surface of the housing 80 by fitting the coupling protrusion 134 into protrusion mounting groove 86 of the fan housing 80.

The fan base 130 and the fan housing 80 may be coupled to each other at a plurality of points by coupling the coupling protrusion 134 and the protrusion mounting groove 86. When the fan base 130 and the fan housing 80 are coupled to each other, the fan 90 may be rotatably disposed between the fan base 130 and the fan housing 80.

A protruding rib 133 may protrude from the base plate 131 and may be disposed radially outside of the bell mouth 132. The protruding rib 133 according to an embodiment may be disposed at a radial outer side of the bell mouth 132, surround an outer circumference of the bell mouth 132, and have an annular shape. In addition, the protruding rib 133 may be integrated with the base plate 131. More specifically, the base plate 131, the bell mouth 132, and the protruding rib 133 may be integrated.

According to an embodiment, the protruding rib 133 may include a second inclined surface 135 that is spaced apart from the shroud 120, and an inner diameter of the second inclined surface 135 may increase toward an upper side thereof. In addition, the second inclined surface 135 may be disposed in parallel to an outer surface of the shroud 120. In addition, an angle between the first inclined surface 87 and a horizontal line may be the same as an angle between the second inclined surface 135 and the horizontal line.

In addition, the protruding rib 133 may be inclined by the same angle as the outer surface of the shroud 120, and a distance between the protruding rib 133 and the shroud 120 may be maintained constant. The protruding rib 133 facing the shroud 120 may protrude upward from the base plate 131 and include the second inclined surface 135 on an upper surface thereof. The second inclined surface 135 of the protruding rib 133 may be spaced apart from the shroud 120 by a predetermined distance and may be disposed in parallel to the outside of the shroud 120.

In addition, the second inclined surface 135 of the protruding rib 133 may have the same inclination angle as the first inclined surface 87 of the inner guide 85 of the fan housing 80. Therefore, the air backflow phenomenon in which a portion of the air moving upward through a space between the shroud 120 and the skirt 107 flows to an inlet of the fan 90 through a space between the shroud 120 and the protruding rib 133 may be prevented.

A passage between the fan 90 and the fan base 130 may be narrow and the bell mouth 132 of the fan base 130 may surround the lower surface of the shroud 120 to reduce or block airflow to the inlet of the fan 90 through an outside of the fan 90, thereby preventing the air backflow phenomenon.

Figure 17:
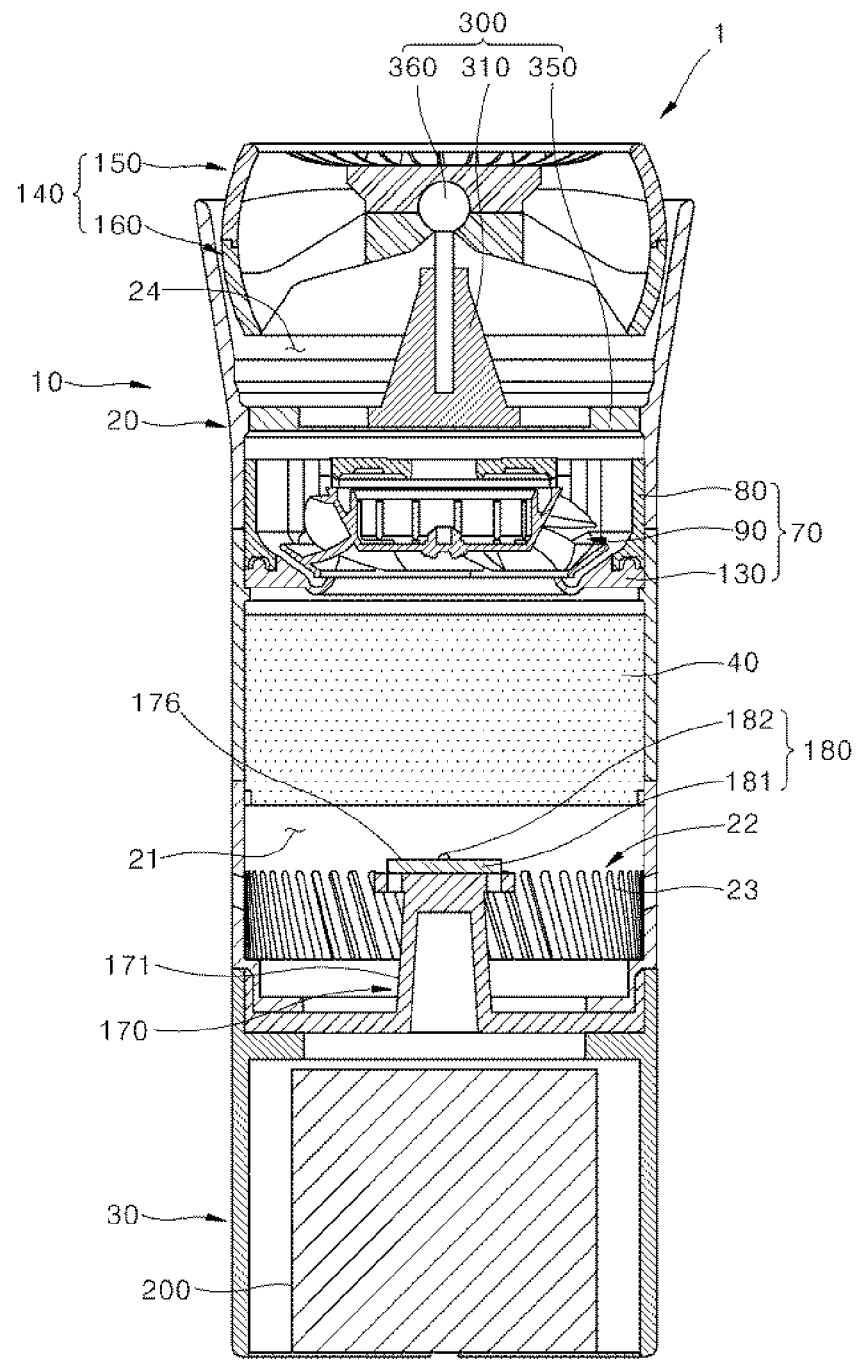
FIG. 17 is a cross-sectional view of the portable air purifier including a mixed flow fan module of FIG. 16.
Figure 18:
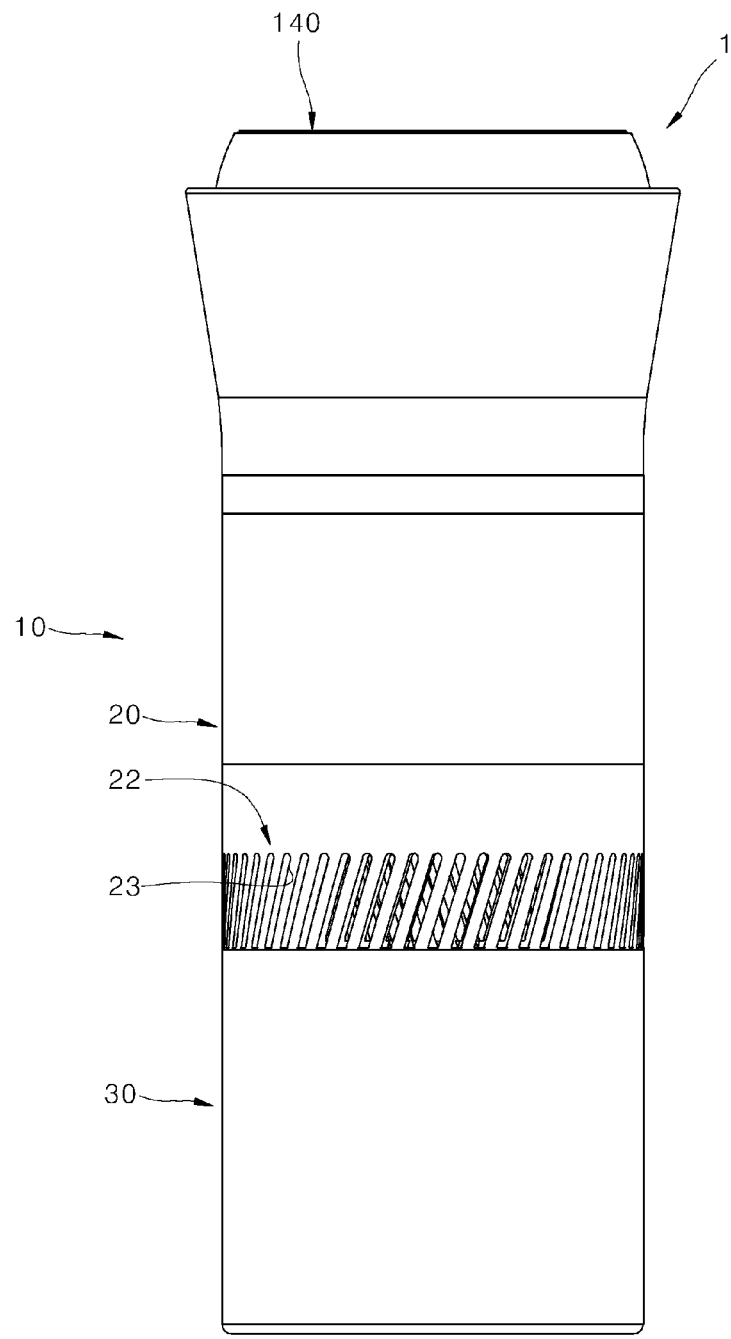
FIG. 18 is a front view of the portable air purifier including a mixed flow fan module of FIG. 16.
Figure 19:
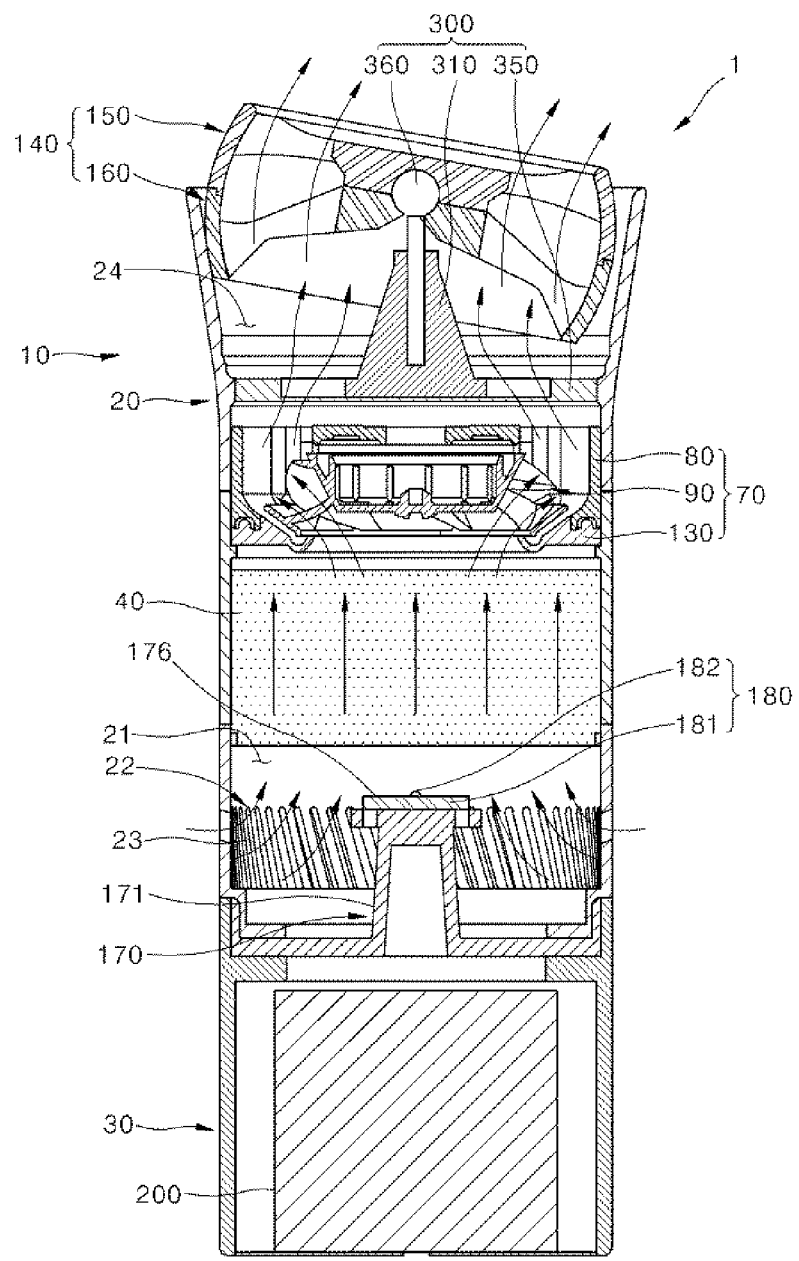
FIG. 19 is a cross-sectional view showing airflow through the portable air purifier including a mixed flow fan module of FIG. 16.

FIG. 16 is an exploded perspective view of a portable air purifier including a mixed flow fan module according to an embodiment. FIG. 17 is a cross-sectional view of the portable air purifier including a mixed flow fan module of FIG. 16. FIG. 18 is a front view of the portable air purifier including a mixed flow fan module of FIG. 16. FIG. 19 is a cross-sectional view showing airflow through the portable air purifier including a mixed flow fan module of FIG. 16.

As shown in FIGS. 16 to 19, portable air purifier 1 having a mixed flow fan module according to an embodiment may include mixed flow fan module 70, housing 10, and filter 40. The mixed flow fan module 70 may include fan housing 80 having an outer surface that is curved along a circumferential direction and defining an operation space, fan 90 rotatably disposed inside of fan housing 80, and fan base 130 coupled to the fan housing 80 to guide air toward the fan 90. The housing 10 may accommodate the mixed flow fan module 70, include a cylindrical inner flow path in contact with the fan housing 80 and that extends in a vertical direction, and define inlet 22 to suction air from a lower portion of the mixed flow fan module 70. The filter 40 may be accommodated in the housing 10, be located on at least one of a lower surface or an upper surface of the mixed flow fan module 70, and purify air. In addition, the portable air purifier 1 having the mixed flow fan module may include at least one of discharger 140, a sterilizer 170, a battery 200, or rotation supporter 300.

According to an embodiment, the housing 10 may include a first case 20 and a second case 30. The first case 20 and the second case 30 may form an external skeleton of the portable air purifier 1 including the mixed flow fan module. The housing 10 may define a cylindrical air flow path and guide airflow toward an upper side thereof from a lower side thereof. In addition, the housing 10 may accommodate the mixed flow fan module 70 having a circular edge. A gap may be prevented from being generated between the mixed flow fan module 70 and the housing 10 and airflow between the mixed flow fan module 70 and the housing 10 blocked. In addition, air may be introduced from the lower portion of the housing 10, discharged above the housing 10 by the mixed flow fan module 70, and easily reach a user located above the air purifier 1.

A side appearance and a bottom appearance of the portable air purifier 1 including the mixed flow fan module may be defined by the first case 20 and the second case 30. The first case 20 and the second case 30 may include an accommodating space. The accommodating space may receive electrical components including the filter 40, the mixed flow fan module 70, the sterilizer 170, the rotation supporter 300, and the battery 200. The first case 20 and the second case 30 may have sufficient strength to protect the components accommodated in the accommodating space from external impact.

The filter 40 may be accommodated in the accommodating space of the first case 20 and be disposed between the mixed flow fan module 70 and the inlet 22. That is, the filter 40 may be disposed under the mixed flow fan module 70 and purify the air suctioned through the inlet 22 of the portable air purifier 1 including the mixed flow fan module. The air may be purified by passing through the filter 40 and be discharged above the portable air purifier 1 including the mixed flow fan module through the mixed flow fan module 70 and the discharger 140.

The filter 40 may be accommodated inside of the first case 20 and purify the air introduced into the inlet 22. In addition, the filter 40 may have a cylindrical shape that extends in the vertical direction.

The filter 40 may include a single filter, or as necessary, may include a plurality of filters disposed in a stacked state. In addition, the filter 40 may further include an additional filter case to house and/or couple the filter(s). The filter case may be coupled to an inside of the first case 20 and include an insertion space to accommodate the filter(s).

The mixed flow fan module 70 may be accommodated in the accommodating space inside of the first case 20 and may be disposed between the discharger 140 and the filter 40. More specifically, the mixed flow fan module 70 may be disposed between discharge outlet 24 and the filter 40. That is, the mixed flow fan module 70 may be disposed on the filter 40, and the discharge outlet 24, the rotation supporter 300, and the discharger 140 may each be disposed above the mixed flow fan module 70. The mixed flow fan module 70 may suction air through the inlet 22 from a lower portion of the filter 40 and discharge the air above the first case 20.

A rotational center of the discharger 140 may be the same as a center of the mixed flow fan module 70 in the vertical direction. Air may be introduced through the inlet 22, flow upward, and be discharged above the portable air purifier 1 through the filter 140, the mixed flow fan module 70, and the discharger 140. The mixed flow fan module 70 may suction the air that has passed through the filter 40 in an axial direction and discharge the air in a direction between the axial direction and a radial direction.

The discharger 140 may be rotatably disposed on the first case 20 and may guide a discharge direction of the air moving upward through the discharge outlet 24. The rotation supporter 300 may be disposed on the first case 20 and the discharger 140 may be rotatably disposed on the rotation supporter 300. As the discharger 140 defines openings at an upper side and a lower side thereof, the air moved to the lower side of the discharger 140 through the discharge outlet 24 may be discharged to an outside of the portable air purifier 1 through the upper side of the discharger 140.

The sterilizer 170 may be disposed below the filter 40 and be coupled to at least one of the first case 20 or the second case 30. The sterilizer 170 may be spaced apart from the filter 40 by a predetermined distance and transmit light for sterilization toward the filter 40. As the light for sterilization transmitted by the sterilizer 170 is harmful to the human body, an installation position of the sterilizer 170 may be set to prevent the light for sterilization from being transmitted outside of the portable air purifier 1 through the inlet 22.

The battery 200 may be accommodated in the accommodating space inside the second case 30 and be disposed below the sterilizer 170. The battery 200 may supply power to drive the portable air purifier 1.

Directions are defined hereinafter. When a direction toward the discharger 140 from the first case 20 is referred to as "an upward direction" and a direction toward the second case 30 from the first case 20 is referred to as "a downward direction", a first direction refers to a vertical direction or an axial direction. In addition, the first direction may be the same as the vertical direction. In addition, "the second direction" may be perpendicular to the first direction and refer to a lateral direction, a horizontal direction, or a radial direction.

Housing 10 may include inlet 22 and may accommodate filter 40, sterilizer 170, and mixed flow fan module 70. In addition, the housing 10 may define an air flow path that extends in a vertical direction. As the housing 10 defines a cylindrical air flow path, frictional resistance of air moving in the vertical direction may be reduced.

In addition, centers of the inlet 22, the filter 40, the sterilizer 170, the mixed flow fan module 70, the discharge outlet 24, and the rotation supporter 300 may be the same in a vertical direction along the vertical reference line passing through a center of the housing 10 in the vertical direction. The air may vertically flow from a lower side of the housing 10 to an upper portion of the housing 10 in a straight line to shorten an air movement path. Thereby, air flow path resistance may be reduced and air purification efficiency improved.

When the portable air purifier 1 is disposed on a horizontal surface, the vertical reference line is the same as the vertical line. In addition, the housing 10 may include a single member or component, or may include a plurality of members or components.

The portable air purifier 1 may have a vertical, elongated cylindrical shape that extends in the vertical direction. A user may use the portable air purifier 1 in a vertical state or a laid-out state. In addition, as the portable air purifier 1 may be accommodated in a groove concave downward, such as a cup holder in a location in which shaking occurs, such as an inside of a vehicle, the portable air purifier 1 may stably maintain its position.

According to an embodiment, the portable air purifier 1 having a mixed flow fan module may include at least one of housing 10, filter 40, mixed flow fan module 70, discharger 140, or rotation supporter 300. In addition, according to an embodiment, the portable air purifier 1 having the mixed flow fan module may further include sterilizer 170 and battery 200. Housing 10 may include first case 20 and second case 30. The first case 20 may include an accommodating space and may define inlet 22 at a side surface of a lower portion thereof to suction air. The first case 20 may have a cylindrical shape and may define openings at an upper side and a lower side thereof. The first case 20 may include a single member or component, or as necessary, may include a plurality of members or components. According to an embodiment, various modifications may be made in which the first case 20 includes the plurality of members or components, the members or components may be coupled by fitting, adhesive, or welding, for example, and may be connected by a fastening member, such as a bolt.

Air may be suctioned through the side surface of the lower portion of the first case 20 and may be discharged through the upper side of the first case 20. For the air suctioning and discharging, the first case 20 may define the inlet 22 including an inlet hole 23 along a circumference of the lower portion of the first case 20 and define discharge outlet 24 at the upper portion of the first case 20.

In addition, the filter 40 may be disposed above the inlet 22 when the inlet 22 is defined along an outer circumference of the first case 20 to suction the air. Therefore, air may flow uniformly along entire surface of the filter 40.

The inlet 22 may include a plurality of the inlet hole 23. The plurality of inlet holes 23 may be inclined obliquely, and as necessary, may have an inequality sign shape with a bent center. In addition, various modifications may be made in which the housing 10 accommodating the filter 40 may further include inlet hole 23 on a side surface thereof to increase a rate of airflow into the filter 40.

Various modifications may be made in which the housing 10 includes a plurality of three or more members.

Various modifications may be made to the configuration in which second case 30 is connected to a lower surface of first case 20 and includes a space to accommodate electric components having battery 200.

At least one of the first case 20 or the second case 30 may have a cylindrical shape. Both the first case 20 and the second case 30 may have the cylindrical shape, or only the second case 30 may have the cylindrical shape. Alternatively, only the first case 20 may have the cylindrical shape as necessary.

When the second case 30 has the cylindrical shape and extends in a vertical direction, the user may easily grab an outer circumference of the second case 30 by hand and may easily place the second case 30 in a cup holder of a vehicle defining a circular cross-sectional groove. In addition, when the first case 20 has the cylindrical shape, friction generated by contact with the curved inner surface of the first case 20 when the air moves upward through the inside of the first case 20 may be reduced, thereby facilitating airflow.

The first case 20 may define an air flow path and the second case 30 may not define an air flow path. Even when the second case 30 is supported by the cup holder or is grabbed by the hand of the user, air may be easily suctioned into and discharged from the first case 20, thereby improving user convenience.

Various modifications may be made to the configuration in which filter 40 is accommodated inside of first case 20 and purified air is introduced into inlet 22. According to an embodiment, the filter 40 may have a cylindrical shape.

The first case 20 may have a circular pipe shape and the filter 40 accommodated inside of the first case 20 may also have a cylindrical shape and contact an inside of the first case 20 such that impurities in the air passing through the inside of the first case 20 may be effectively removed. In addition, the filter 40 may have a circular cross-section and include a largest area inside of the first case 20. In addition, the filter 40 may be manufactured in a cylinder shape, such as a cylindrical shape. The filter 40 may be manufactured by cutting a cylindrical fabric, for example. The cylindrical filter 40 may obtain a large air movement path, thereby minimizing pressure loss and improving air purification efficiency of the filter 40.

An outer diameter of the filter 40 may be manufactured to be larger than a suction diameter of bell mouth 132 to guide air suctioned into mixed flow fan module 70, thereby maximizing a volume of the filter 40. In addition, according to this embodiment, the filter 40, the mixed flow fan module 70, and the discharger 140 may be arranged in the vertical direction along the housing 10, and air may also flow in the vertical direction. That is, air may flow in a straight direction as an arrangement direction of the filter 40, the mixed flow fan module 70, and the discharger 140 based on operation of the mixed flow fan module 70.

When the air flows in the straight direction, resistance to the airflow is lowered and the airflow may be facilitated. Therefore, a sufficient amount of air may be suctioned and discharged by the mixed flow fan module 70, thereby improving an air purification performance of the portable air purifier 1 including the mixed flow fan module.

Various modifications may be made to the configuration in which discharger 140 is disposed at discharge outlet 24 of housing 10, is rotatably disposed on rotation supporter 300, and guides a discharge direction of air passing through mixed flow fan module 70. According to an embodiment, the discharger 140 may be rotatably disposed on a spherical ball joint 360 of the rotation supporter 300, thereby facilitating a rotation operation thereof.

The discharger 140 disposed at the upper portion of the housing 10 may be opened in the vertical direction and may be rotatably connected to the rotation supporter 300 to adjust a discharge direction of the air through the mixed flow fan module 70. According to an embodiment, the discharger 140 may include a first discharger 150 and a second discharger 160.

Various modifications may be made to the configuration in which first discharger 150 is disposed at a first side of the ball joint 360 and includes a plurality of vanes 156 to guide discharge of air. According to an embodiment, the first discharger 150 may include a first discharge core 152, first discharge body 154, and a vane 156.

The first discharge core 152 may be disposed above the ball joint 360 and may have various shapes including a disk shape. In addition, the first discharge body 154 may be spaced apart from the first discharge core 152, may have an annular shape, and may surround an outside of the first discharge core 152. In addition, an outer side of the first discharge body 154 may have a curved shape and be spaced apart from the housing 10, thereby preventing contact with the housing 10 when the first discharger 150 is rotated. In addition, as the first discharge core 152 and the first discharge body 154 are connected to each other by the plurality of vanes 156, the first discharge core 152, the first discharge body 154, and the vane 156 may be rotated together.

Various modifications may be made to the configuration in which second discharger 160 is disposed at a second side of the ball joint 360, that is, a lower side of the ball joint 360 FIG. 17, is connected to first discharger 150, and rotated about the ball joint 360 together with rotation of the first discharger 150. According to an embodiment, the second discharger 160 may include a second discharge core 161, a second discharge body 162, and a discharge supporter 163.

The second discharge core 161 may surround a lower side of the spherical ball joint 360 and be disposed below the first discharge core 152. In addition, the second discharge body 162 may have an annular shape, surround an outside of the second discharge core 161, and include a curved outer surface.

In addition, as the second discharge core 161 and the second discharge body 162 are connected by a plurality of discharge supporters 163, the second discharge core 161, the second discharge body 162, and the discharge supporter 163 may be rotated together.

Various modifications may be made to the configuration in which sterilizer 170 is disposed between filter 40 and second case 30 and transmits light for sterilization toward the filter 40. According to an embodiment, the sterilizer 170 may include at least one of a sterilization supporter 171, a supporter 176, or a transmitter 180.

The sterilization supporter 171 may be disposed between first case 20 and second case 30 and close a lower surface of the first case 20. In addition, various modifications may be made to the configuration in which the sterilization supporter 171 is disposed below the transmitter 180 and is connected to housing 10 to restrict movement thereof.

Air is introduced into the first case 20 through inlet 22 and is blocked from moving to the second case 30 by the sterilization supporter 171, thereby increasing a flow rate of air moving to mixed flow fan module 70 and improving an air purification performance of portable air purifier 1.

Various modifications may be made to the configuration in which the supporter 176 protrudes upward from a center of the sterilization supporter 171 and supports a lower surface of the transmitter 180. In addition, the supporter 176 may be disposed at a radial center of the inlet 22 and have a circular cross-section, thereby reducing air friction.

The supporter 176 may have a column shape and may protrude upward from the center of the sterilization supporter 171. In addition, the supporter 176 may have a cylindrical shape or a conical shape, for example. According to an embodiment, a cross-section of the supporter 176 may decrease from a lower side thereof to an upper side thereof and be disposed at a center of the first case 20 including the inlet 22, thereby minimizing air friction.

The sterilization supporter 171 may have a circular cross-section and sterilize the filter 40. The air introduced through the inlet 22 may be rotated spirally by the inclined shape of the inlet hole, rotate at an outside of the supporter 176, and then move upward toward the filter 40. That is, the sterilizer 170 may be disposed at a central portion of the first case 20, and air introduced through the inlet 22 may move upward while rotating along an outer circumference of the sterilizer 170, thereby reducing flow path resistance of the sterilizer 170.

A rotational center of the supporter 176 and the fan 90 and a core 310 of the rotation supporter 300 described hereinafter are disposed on a vertical straight line. Therefore, resistance to the air moving from the lower side to the upper side may be lowered, thereby facilitating airflow. Based on the easy airflow, an air purification performance of the portable air purifier 1 may be improved.

The transmitter 180 may be disposed on the supporter 176 and may transmit light for sterilization in a direction toward the filter 40. In addition, the transmitter 180 may be disposed on a vertical reference line passing through a radial center of the inlet 22 in the vertical direction. Therefore, when the filter 40 is disposed on the transmitter 180, a relatively low number of sterilization light source 182 may sterilize an entire lower surface of the filter 40, thereby reducing production and maintenance costs.

In addition, various modifications may be made to the configuration in which the transmitter 180 is provided at a same position as or higher than an upper side of the inlet 22. According to an embodiment, the transmitter 180 may include a printed circuit board 181 and the sterilization light source 182. The printed circuit board 181 may be disposed on the supporter 176 and may support the sterilization light source 182 that transmits sterilization light. The sterilization light source 182 may be, for example, an ultraviolet rays (UVC) light emitting diode (LED). Also, various types of sterilization devices may be used within the technical idea of sterilizing bacteria in the filter 40.

As the sterilization light source 182 of the sterilizer 170 is disposed on the inlet 22, light transmission to an outside of the first case 20 through the inlet 22 by the sterilization light source 182 may be prevented.

Various modifications may be made to the configuration in which rotation supporter 300 is connected to housing 10 and rotatably supports discharger 140. In addition, the rotation supporter 300 may rotatably support the discharger 140 at a center of discharge outlet 24 defined inside of the housing 10. According to an embodiment, the rotation supporter 300 may include at least one of core 310, core supporter 350, or ball joint 360.

The core r 310 may be disposed below the discharger 140 to control a discharge direction of air and may extend from a center of the discharge outlet 24 toward the discharger 140. The core 310 may be disposed at a radial center of the second case 30.

A cross-section of a lower side of the core 310 may have a circular shape and the cross-section thereof may have the same center as a center of the mixed flow fan module 70 described hereinafter. That is, support plate 81 disposed at a radial center of the mixed flow fan module 70 may be located below the core 310. Air may be moved upward along an outer circumference of the support plate 81, flow upward along an outside of the core 310, and be moved inside of the discharger 140, thereby reducing flow path resistance of air and improving air cleaning efficiency.

A lower surface of the core 310 facing the support plate 81 of the mixed flow fan module 70 may have a same area as or a smaller area than that of the support plate 81 such that an increase in flow path resistance due to contact of air passing through the mixed flow fan module 70 with the lower surface of the core 310 may be prevented. A cross-sectional area of the lower surface of the core 310 may be the same as or smaller than that of the support plate 81 of the mixed flow fan module 70. The core 310 may be disposed above the support plate 81 in a first direction. In addition, as the core 310 has a conical shape that protrudes upward, a frictional area with air moving outside of the core 310 may be minimized and air friction reduced, thereby improving air cleaning efficiency.

The core supporter 350 may extend to an outside of the core 310 and may be connected to the housing 10. Therefore, movement of the core supporter 350 and the core 310 may be restricted.

In addition, according to an embodiment, the core supporter 350 may be disposed above connecting supporter 82 of the mixed flow fan module 70 described hereinafter. For example, when four connecting supporters 82 are disposed by 90 degrees around the support plate 81, four core supporters 350 may be also disposed by 90 degrees around the core 310. The connecting supporter 82 may be disposed at the lower surface of the core supporter 350, and the core supporter 350 and the connecting supporter 82 may overlap with each other when viewed from a top of the core supporter 350.

Therefore, air may be moved upward through the outside of the connecting supporter 82 and may pass through the outside of the core supporter 350 disposed on the connecting supporter 82, thereby minimizing friction generated by the air movement and improving air cleaning efficiency.

According to another embodiment, four or more core supporters 350 may be disposed radially around the core 310. In addition, various modifications may be made in which an edge may be coupled to the housing 10 when the core supporter 350 is connected to the ring-shaped edge.

Various modifications may be made to the configuration in which the ball joint 360 is coupled to the core 310 and rotatably supports the discharger 140. According to an embodiment, the ball joint 360 may have a spherical end, may be coupled to the inside of the discharger 140, and may rotatably support the discharger 140. An upper portion of the ball joint 360 may have a spherical shape and a body of the bar-shaped ball joint 360 that extends downward from the spherical upper portion may be inserted into and coupled to the core 310 through a hole defined at an upper side of the core 310. The ball joint and the core 310 may be coupled by various coupling methods, for example, by screw fastening, pin fastening, or an adhesive.

An airflow pattern of a portable air purifier according to an embodiment is described hereinafter.

Housing 10 may include inlet 22 along an outer circumference of first case 20 to suction external air, and air outside of the first case 20 may be introduced into the first case 20 through the inlet 22, thereby increasing an air suction flow rate. Air outside of the portable air purifier 1 including a mixed flow fan module may be introduced into the portable air purifier 1 based on an operation of the mixed flow fan module 70. In this case, air outside of the portable air purifier 1 forms a spiral airflow through inclined inlet hole 23. The air having passed through the inlet hole 23 moves upward while rotating along the outer circumference of sterilization supporter 171.

The air is introduced into the first case 20, is moved upward while spirally rotating, and passes through filter 40. In this process, the filter 40 may filter out physical particles, such as dust/fine dust/ultrafine dust, chemical substances, such as odor particles/harmful gases, and microorganisms, such as bacteria/viruses.

The filter 40 and the mixed flow fan module 70 may be arranged on a vertical straight line, thereby minimizing flow loss and efficiently suctioning and filtering the air. The air that has passed through the filter 40, that is, the purified air may be introduced into the mixed flow fan module 70. The airflow may be guided by bell mouth 132. Therefore, easy air introduction into the mixed flow fan module 70 may be induced.

The air introduced into the mixed flow fan module 70 may be discharged above the mixed flow fan module 70. The air may be discharged above the mixed flow fan module 70 in a mixed flow direction. In this case, the mixed flow direction may be referred to as an upward diagonal direction.

Air may be suctioned into a lower central portion of the mixed flow fan module 70 and move in an upward inclined direction through a space between the hub 100 including the fan blade 110 and the shroud 120. In addition, the air may be moved upward along the side supporter 84 that extends vertically and has an upward straightness.

Bell mouth 132 may be provided to prevent an air backflow phenomenon in which a portion of the air moving rearward of the fan 90, that is, upward of the fan 90 of FIG. 6, based on rotation of the fan 90 flows back to an inlet of the fan 90 through the space between the fan 90 and the fan base 130. The bell mouth 132 may surround the inlet protrusion 121 of the shroud 120 in a hemispherical shape and be spaced apart from the inlet protrusion 121 by a predetermined distance.

In addition, second inclined surface 135 of protruding rib 133 and the shroud 120 may be disposed in parallel to each other and a distance between the second inclined surface 135 and the shroud 120 may be small to prevent the air backflow phenomenon. The first inclined surface 87 defined on an upper surface of the inner guide 85 may be inclined by a same angle as the second inclined surface 135 and connect the side supporter 84 to the protruding rib 133.

The air may be moved in a rearward direction, for example, an upward direction of FIG. 6, of the fan 90 by rotation of the fan 90 and be discharged upward from the fan 90 without the air backflow phenomenon because a passage formed by the first inclined surface 82, the second inclined surface 135, and the shroud 120 is smaller than a space between the fan 90 and the side supporter 84. The passage between the bell mouth 132 and the inlet protrusion 21 may be small. Therefore, an air backflow phenomenon in which a portion of the air introduced between the second inclined surface 135 and the shroud 120 flows to the space between the bell mouth 132 and the inlet protrusion 121 may be prevented.

The first inclined surface 83 may extend obliquely toward the side supporter 84. The air may be moved obliquely upward along the first inclined surface 83 and be moved upward along the side supporter 84 when the air moves upward from the fan housing 80 through the fan 90. Therefore, the air backflow phenomenon in which air is moved downward from the first inclined surface 87 may be prevented.

The air may be discharged upward from the mixed flow fan module 70, may be introduced into the discharger 140 through a lower side of the discharger 140, and may be discharged upward from the discharger 140. As the discharger 140 is rotated within a predetermined angle range, a discharge direction of air may be adjusted based on an installation angle of the discharger 140.

In addition, as an inner side of the discharger 140 defines a concave groove, an increase in discharge resistance of the air whose direction is changed by the discharger 140 may be reduced. In addition, the filter 40, the mixed flow fan module 70, and the discharger 140 may be arranged on a vertical straight line, thereby efficiently suctioning air, filtering, and discharging the purified air while minimizing flow loss of air.

According to an embodiment, the portable air purifier uses the mixed flow fan module 70 to maximize a blowing performance thereof when the air discharge direction is the axial direction under a fixed pressure condition. In addition, the fan base 130 maintains a constant distance from the fan 90 and provides an air backflow prevention structure, which extends to the inner wall of the fan housing 80, thereby minimizing flow loss due to the air backflow.

In addition, the mixed flow fan module 70 may be disposed inside of the cylindrical housing 10 in a customized manner compared to other fan modules using a fan of the same diameter. Therefore, there is no increase in size due to the fastener and the mixed flow fan module and the portable air purifier including the mixed flow fan module may be miniaturized.

Embodiments disclosed herein provide a mixed flow fan module suitable for blowing air upward from downward along housing and a portable air purifier including a mixed flow fan module. Embodiments disclosed herein further provide a mixed flow fan module easily blowing purified air to a user located above an air purifier, and a portable air purifier including a mixed flow fan module.

Embodiments disclosed herein are not limited to advantages mentioned herein. Further, advantages not mentioned may be understood by the description, and will be more clearly understood by the embodiments. It will also be readily apparent that the advantages of the embodiments may be realized by the means indicated in claims and a combination thereof.

For the mixed flow fan module and the portable air purifier including the mixed flow fan module according to embodiments disclosed herein, the mixed flow fan module may have a circular outer circumference. More specifically, the mixed flow fan module may have an outer circumference that is curved along a circumferential direction and may be accommodated in the cylindrical housing in contact with an inside of the housing, thereby preventing a decrease in blowing capacity thereof and facilitating air blowing to move the air upward from downward along the housing.

Further, for the mixed flow fan module and the portable air purifier including the mixed flow fan module according to embodiments disclosed herein, air may pass through the mixed flow fan module and easily reach a user located above the air purifier. More specifically, the air may be introduced through a lower side of the housing, may be discharged upward from the housing by the mixed flow fan module, and may easily reach a user located above the air purifier.

Furthermore, the mixed flow fan module and the portable air purifier including the mixed flow fan module according to embodiments disclosed herein may prevent air backflow to an inlet of a fan. More specifically, a passage between the fan and a fan base may be narrow and a bell mouth of the fan base may surround a lower surface of a shroud, thereby reducing or blocking airflow to the inlet of the fan through an outside of the fan.

According to embodiments disclosed herein, a mixed flow fan module may include a fan housing having an outer surface that is curved along a circumferential direction and defining an operation space; a fan rotatably disposed inside of the fan housing; and a fan base coupled to the fan housing and configured to guide air introduction in a direction toward the fan. The fan housing, the fan, and the fan base may form a module by being coupled to one another.

The fan housing may include at least one of a support plate, a connecting supporter, a wire guide, a side supporter, an inner guide, or a protrusion mounting groove. The support plate may be disposed at a center of the fan housing. A connecting supporter may extend outward from the support plate in a radial direction.

In addition, a side supporter may be spaced apart from the support plate, may be connected to the connecting supporter, and may have a circular curved surface along an outer circumference thereof. A protrusion mounting groove may be defined on a lower surface of the side supporter, may have a concaved shape, and a coupling protrusion of the fan base may be connected to the protrusion mounting groove.

An inner guide may protrude inward from the side supporter and have a first inclined surface, and an inner diameter of the first inclined surface may be narrowed toward the fan base. In addition, the inner guide may be disposed at a lower portion of the side supporter facing the fan base. A wire guide may be disposed on a side surface of the connecting supporter and may be configured to support a lower side of a wire to move the wire along the side surface of the connecting supporter.

The fan may include a hub, a fan blade, and a shroud. The hub may be disposed at a center of the fan housing and may rotate by receiving external power. In addition, the hub may include at least one of a hub plate, a shaft coupler, an inner protrusion, a skirt, a first reinforcing protrusion, or a second reinforcing protrusion.

A hub plate may be rotatably disposed inside of the fan housing and may be located at a radial central portion of the fan housing. In addition, a shaft coupler may be disposed at a center of the hub plate, may protrude either upward or downward from the hub plate, and may be connected to a shaft to receive a rotational power.

A first reinforcing protrusion may be disposed radially around the shaft coupler, may be defined at an outside of the shaft coupler, and may have a band shape. Further, an inner protrusion may be defined along an outer edge of the hub plate, may have a circular arc shape, and may extend upward. Furthermore, a second reinforcing protrusion may extend in a vertical direction along an inner surface of the inner protrusion, may define a lower portion of the second reinforcing protrusion that is curved toward the shaft coupler and is coupled to the hub plate, and may have a band shape. A skirt may extend obliquely upward from an outside of the inner protrusion.

A plurality of fan blades may have a first end connected to the hub and may be spaced apart from one another by equal distance along an outer circumferential surface of the hub. A shroud may be connected to a second end of the fan blade, may have an annular shape, and may be spaced apart from the fan base. In addition, an outer diameter of the hub and an inner diameter of the shroud may each decrease from an upper side thereof to a lower side thereof. A distance between the shroud and the skirt may be increased from a lower side thereof to an upper side thereof. In addition, when an angle between the shroud and a horizontal line is angle B1 and an angle between the skirt and the horizontal line is angle B2, angle B1 is smaller than angle B2.

Each of a plurality of fan blades may connect a skirt to the shroud and extends spirally. The shroud may further include an inlet protrusion defined at a lower side of the shroud. The inlet protrusion may have a ring shape, extend downward, and be spaced apart from the fan base by a set distance.

The fan base may include a base plate having a plate shape, that extends annularly, and defining a hollow at a central portion thereof to move air; and a bell mouth having an annular shape, disposed along an inner side of the base plate facing the hollow, defining a groove concave upward, and surrounding a lower side of the inlet protrusion. The fan base may further include a protruding rib disposed at an outside of the bell mouth in a radial direction, surrounding an outer circumference of the bell mouth, and having an annular shape. The protruding rib may include a second inclined surface that is spaced apart from the shroud and an inner diameter of the second inclined surface may increase toward an upper side thereof. The second inclined surface may be arranged in parallel to the shroud. In addition, the first inclined surface and the second inclined surface may have a same angle with respect to a horizontal line.

A portable air purifier may include a mixed flow fan module including a fan housing having an outer surface that is curved along a circumferential direction and defining an operation space, a fan rotatably disposed inside of the fan housing, and a fan base coupled to the fan housing and configured to guide air introduction toward the fan; a housing defining a cylindrical inner flow path in contact with the fan housing and that extends vertically, configured to accommodate the mixed flow fan module, and including an inlet defined at a lower portion of the mixed flow fan module and configured to suction air; and a filter accommodated inside of the housing, disposed on at least one of a lower surface or an upper surface of the mixed flow fan module, and configured to purify air.

The fan housing of the mixed flow fan module may have a circular outer side and be accommodated in the cylindrical housing to stably discharge air vertically, thereby improving air cleaning efficiency. Further, the air may pass through the mixed flow fan module and easily reach a user located above the air purifier, thereby improving customer satisfaction.

Furthermore, the passage between the fan and the fan base may be narrow and the bell mouth of the fan base may surround the lower surface of the shroud, thereby preventing air backflow to the inlet of the fan and improving air blowing efficiency.

Further effects in addition to the above-mentioned effects are described together while describing specific matters for carrying out the disclosure.

Although embodiments have been described as described above, the embodiments are not limited to the embodiments and drawings disclosed herein, and various modifications can be made by those skilled in the art within the scope of the technical idea. Further, even if working effects obtained based on configurations of the embodiments are not explicitly described in the description of embodiments, effects predictable based on the corresponding configuration have to be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mixed flow fan module, comprising:
   a fan housing having an outer surface that is curved along a circumferential direction and defining an operation space;
   a fan rotatably disposed inside of the fan housing; and
   a fan base coupled to the fan housing and configured to guide air in a direction toward the fan, wherein the fan housing, the fan, and the fan base are coupled together to form a module, wherein the fan comprises:
     a hub configured to be disposed at a center of the fan housing and rotated by receiving external power;
     a plurality of fan blades each having a first end connected to the hub and spaced apart from one another by an equal distance along an outer circumferential surface of the hub; and
     a shroud connected to a second end of each of the plurality of fan blades, having an annular shape, and spaced apart from the fan base, and wherein the hub comprises:
       a hub plate rotatably disposed inside of the fan housing and located at a radial central portion of the fan housing;
       a shaft coupler disposed at a center of the hub plate, that protrudes either upward or downward from the hub plate, and is connected to a shaft to receive a rotational power;
       an inner protrusion defined along an outer edge of the hub plate, having a circular arc shape, and that extends upward; and
       a skirt that extends obliquely upward from an outside of the inner protrusion.

2. The mixed flow fan module of claim 1, wherein the fan housing comprises:
   a support plate disposed at a center of the fan housing;
   a connecting supporter that extends outward from the support plate in a radial direction; and
   a side supporter that is spaced apart from the support plate, connected to the connecting supporter, and having a circular curved surface along an outer circumference thereof.

3. The mixed flow fan module of claim 2, wherein the fan housing further comprises a protrusion mounting groove defined on a lower surface of the side supporter, having a concave shape, and to which a coupling protrusion of the fan base is coupled.

4. The mixed flow fan module of claim 2, wherein the fan housing further comprises an inner guide that protrudes inward from the side supporter and having a first inclined surface, wherein an inner diameter of the first inclined surface decreases toward the fan base.

5. The mixed flow fan module of claim 2, wherein the fan housing further comprises a wire guide disposed on a side surface of the connecting supporter and configured to support a lower side of a wire to move the wire along the side surface of the connecting supporter.

6. The mixed flow fan module of claim 1, wherein an outer diameter of the hub and an inner diameter of the shroud each decreases from an upper side thereof to a lower side thereof.

7. The mixed flow fan module of claim 1, wherein the hub further comprises at least one first reinforcing protrusion disposed radially around the shaft coupler, defined at an outside of the shaft coupler, and having a band shape.

8. The mixed flow fan module of claim 1, wherein the hub further comprises at least one second reinforcing protrusion that extends in a vertical direction along an inner surface of the inner protrusion, defines a lower portion of the at least one second reinforcing protrusion that is curved toward the shaft coupler and is coupled to the hub plate, and having a band shape.

9. The mixed flow fan module of claim 1, wherein a distance between the shroud and the skirt increases from a lower side thereof to an upper side thereof.

10. The mixed flow fan module of claim 1, wherein the shroud further comprises an inlet protrusion defined at a lower side of the shroud, and wherein the inlet protrusion has a ring shape, extends downward, and is spaced apart from the fan base by a predetermined distance.

11. The mixed flow fan module of claim 10, wherein the fan base comprises:
   a base plate having a plate shape, that extends annularly, and defining a hollow at a central portion through which air moves; and
   a bell mouth having an annular shape, disposed along an inner side of the base plate facing the hole, defining a groove concave upward, and surrounding a lower side of the inlet protrusion.

12. The mixed flow fan module of claim 11, wherein the fan base further comprises a protruding rib disposed at an outside of the bell mouth in a radial direction, surrounding an outer circumference of the bell mouth, and having an annular shape.

13. The mixed flow fan module of claim 12, wherein the protruding rib comprises a second inclined surface spaced apart from the shroud, and wherein an inner diameter of the second inclined surface increased toward an upper side thereof.

14. A portable air purifier including the mixed flow fan module of claim 1.

15. A portable air purifier comprising a mixed flow fan module, the portable air purifier comprising:
   a mixed flow fan module comprising a fan housing having an outer surface that is curved along a circumferential direction and defining an operation space, a fan rotatably disposed inside of the fan housing, and a fan base coupled to the fan housing and configured to guide air toward the fan;
   a housing defining a cylindrical inner flow path in contact with the fan housing and that extends vertically, configured to accommodate the mixed flow fan module, and comprising an inlet defined at a lower portion of the mixed flow fan module and through which air is suctioned; and
   a filter accommodated inside of the housing, disposed on at least one of a lower surface or an upper surface of the mixed flow fan module, and configured to purify air, wherein the fan comprises:
      a hub configured to be disposed at a center of the fan housing and rotated by receiving external power;
      a plurality of fan blades each having a first end connected to the hub and spaced apart from one another by an equal distance along an outer circumferential surface of the hub; and
      a shroud connected to a second end of each of the plurality of fan blades, having an annular shape, and spaced apart from the fan base, and wherein the hub comprises:
         a hub plate rotatably disposed inside of the fan housing and located at a radial central portion of the fan housing;
         a shaft coupler disposed at a center of the hub plate, that protrudes either upward or downward from the hub plate, and is connected to a shaft to receive a rotational power;
         an inner protrusion defined along an outer edge of the hub plate, having a circular arc shape, and that extends upward; and
         a skirt that extends obliquely upward from an outside of the inner protrusion.

16. The portable air purifier of claim 15, wherein the fan housing comprises:
   a support plate disposed at a central portion of the fan housing;
   a connecting supporter that extends outward from the support plate in a radial direction;
   a side supporter that is spaced apart from the support plate, is connected to the connecting supporter, and having a circular curved surface that extends along an outer circumference thereof;
   an inner guide that protrudes inward from the side supporter and having a first inclined surface wherein an inner diameter of the first inclined surface decreases toward the fan base.

17. The portable air purifier of claim 16, wherein the fan comprises:
   a hub configured to be disposed at a center of the fan housing and rotated by receiving external power;
   a plurality of fan blades each having a first end connected to the hub and spaced apart from one another by an equal distance along an outer circumferential surface of the hub; and
   a shroud connected to a second end of each of the plurality of fan blades, having an annular shape, and defining an inlet protrusion that protrudes toward the fan base.

18. The portable air purifier of claim 17, wherein the fan base comprises:
   a base plate having a plate shape, that extends annularly, and defining a hole at a central portion thereof through which air moves;
   a bell mouth having an annular shape, disposed along an inner side of the base plate facing the hole, defining a groove that is concave upward, and surrounding a lower side of the inlet protrusion; and
   a protruding rib disposed at an outside of the bell mouth in a radial direction, surrounding an outer circumference of the bell mouth, and having an annular shape.

19. The portable air purifier of claim 18, wherein the protruding rib comprises a second inclined surface that is spaced apart from the shroud, wherein an inner diameter of the second inclined surface increases toward an upper side of the second inclined surface, and wherein the first inclined surface and the second inclined surface have a same angle with respect to a horizontal line.

20. A portable air purifier comprising a mixed flow fan module, the portable air purifier comprising:
   a mixed flow fan module comprising a fan housing having an outer surface that is curved along a circumferential direction and defining an operation space, a fan rotatably disposed inside of the fan housing, and a fan base coupled to the fan housing and configured to guide air toward the fan;
   a cylindrical housing defining an inner flow path in contact with the fan housing and that extends vertically, configured to accommodate the mixed flow fan module, and comprising an inlet defined at a lower portion of the mixed flow fan module and through which air is suctioned;

a battery configured to provide power for the mixed flow fan module;

a filter accommodated inside of the cylindrical housing, disposed upstream of the mixed flow fan module, and configured to purify air; and a discharger disposed downstream of the mixed flow fan module and configured to discharge purified air, wherein the fan comprises:

a hub configured to be disposed at a center of the fan housing and rotated by receiving external power;

a plurality of fan blades each having a first end connected to the hub and spaced apart from one another by an equal distance along an outer circumferential surface of the hub; and a shroud connected to a second end of each of the plurality of fan blades, having an annular shape, and spaced apart from the fan base, and wherein the hub comprises:

a hub plate rotatably disposed inside of the fan housing and located at a radial central portion of the fan housing;

a shaft coupler disposed at a center of the hub plate, that protrudes either upward or downward from the hub plate, and is connected to a shaft to receive a rotational power;

an inner protrusion defined along an outer edge of the hub plate, having a circular arc shape, and that extends upward; and a skirt that extends obliquely upward from an outside of the inner protrusion.

* * * * *